(12) United States Patent
Holtcamp et al.

(10) Patent No.: US 10,851,187 B2
(45) Date of Patent: Dec. 1, 2020

(54) BRIDGED METALLOCENE CATALYSTS WITH A PENDANT GROUP 13 ELEMENT, CATALYST SYSTEMS CONTAINING SAME, PROCESSES FOR MAKING A POLYMER PRODUCT USING SAME, AND PRODUCTS MADE FROM SAME

(71) Applicant: ExxonMobil Chemical Patents Inc., Baytown, TX (US)

(72) Inventors: Matthew W. Holtcamp, Huffman, TX (US); Subramaniam Kuppuswamy, Mont Belvieu, TX (US); Matthew S. Bedoya, Humble, TX (US); Kevin A. Stevens, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/250,515

(22) Filed: Jan. 17, 2019

(65) Prior Publication Data

US 2019/0233552 A1    Aug. 1, 2019

Related U.S. Application Data

(60) Provisional application No. 62/624,549, filed on Jan. 31, 2018.

(51) Int. Cl.
*C07F 17/00* (2006.01)
*C08F 4/6592* (2006.01)
(Continued)

(52) U.S. Cl.
CPC .......... *C08F 4/65927* (2013.01); *C07F 17/00* (2013.01); *C08F 4/65908* (2013.01);
(Continued)

(58) Field of Classification Search
CPC ............................ C07F 17/00; C08F 4/65927
See application file for complete search history.

(56) References Cited

U.S. PATENT DOCUMENTS

| 4,701,432 A | 10/1987 | Welborn, Jr. |
| 5,032,562 A | 7/1991 | Lo et al. |

(Continued)

FOREIGN PATENT DOCUMENTS

| EP | 0 676 418 | 10/1995 |
| EP | 0 705 851 | 4/1996 |

(Continued)

OTHER PUBLICATIONS

Amsharov et al., "Towards the Isomer_Specific Synthesis of Higher Fullerenes and Buckybowls by the Surface_Catalyzed Cyclodehydrogenation of Aromatic Precursors," Angew. Chem. Int. Ed., 2010, vol. 49, No. 49, pp. 9392-9396.

(Continued)

*Primary Examiner* — Caixia Lu

(57) ABSTRACT

A metallocene catalyst compound can comprise a structure represented by formula (F-MC) below comprising a first cyclopentadienyl ring with carbon atoms directly connected with $R^1$, $R^2$, $R^4$, and $R^5$, and a second cyclopentadienyl ring with carbon atoms directly connected with $R^{10}$, $R^{11}$, $R^{12}$, (Continued)

and $R^{13}$, and a bridging group (BG) directly connecting the first and second cyclopentadienyl rings

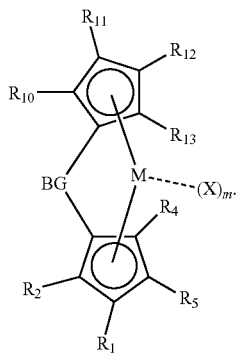

(F-MC)

A catalyst system can include the metallocene compound, a non-coordinating anion type activator comprising a supported alumoxane or aluminum alkyl, and optionally a scavenger. A process for making a polymeric product can comprise: contacting a C2-C22 alpha-olefin feed with the catalyst system to obtain a polymerization reaction mixture; and obtaining a polymer product from the polymerization reaction mixture. A polymer product can be made by the process to exhibit at least an Mn from 7000 g/mol to 70000 g/mol and a PDI from 4.1 to 9.0.

16 Claims, 1 Drawing Sheet

(51) Int. Cl.
  *C08F 4/659*  (2006.01)
  *C08F 210/16*  (2006.01)
  *C08F 4/646*  (2006.01)

(52) U.S. Cl.
  CPC ........ *C08F 4/65912* (2013.01); *C08F 210/16* (2013.01); *C08F 4/6465* (2013.01); *C08F 2500/12* (2013.01)

(56) References Cited

U.S. PATENT DOCUMENTS

| | | | |
|---|---|---|---|
| 5,077,255 A | 12/1991 | Welborn, Jr. | |
| 5,135,526 A | 8/1992 | Zinnanti et al. | |
| 5,183,867 A | 2/1993 | Welborn, Jr. | |
| 5,382,630 A | 1/1995 | Stehling et al. | |
| 5,382,631 A | 1/1995 | Stehling et al. | |
| 5,516,848 A | 5/1996 | Canich et al. | |
| 5,525,678 A | 6/1996 | Mink et al. | |
| 6,069,213 A | 5/2000 | Nemzek et al. | |
| 6,194,341 B1 | 2/2001 | Canich et al. | 502/113 |
| 6,207,606 B1 | 3/2001 | Lue et al. | |
| 6,211,312 B1* | 4/2001 | Holtcamp | C08F 10/00 502/153 |
| 6,262,197 B1 | 7/2001 | Aulbach et al. | |
| 6,291,610 B1* | 9/2001 | Holtcamp | C08F 10/00 502/117 |
| 6,380,311 B1 | 4/2002 | Razavi et al. | |
| 6,656,866 B2 | 12/2003 | Wenzel et al. | |
| 6,828,394 B2 | 12/2004 | Vaughan et al. | |
| 6,956,094 B2 | 10/2005 | Mawson et al. | |
| 6,964,937 B2 | 11/2005 | Mink et al. | |
| 6,995,109 B2 | 2/2006 | Mink et al. | |
| 7,041,617 B2 | 5/2006 | Jensen et al. | |
| 7,119,153 B2 | 10/2006 | Jensen et al. | |
| 7,129,302 B2 | 10/2006 | Mink et al. | |
| 7,141,632 B2 | 11/2006 | Vaughan et al. | |
| 7,172,987 B2 | 2/2007 | Kao et al. | |
| 7,179,876 B2 | 2/2007 | Szul et al. | |
| 7,192,902 B2 | 3/2007 | Brinen et al. | |
| 7,199,072 B2 | 4/2007 | Crowther et al. | |
| 7,199,073 B2 | 4/2007 | Martin et al. | |
| 7,226,886 B2 | 6/2007 | Jayaratne et al. | |
| 7,285,608 B2 | 10/2007 | Schottek et al. | |
| 7,312,283 B2 | 12/2007 | Martin et al. | |
| 7,355,058 B2 | 4/2008 | Luo et al. | |
| 7,385,015 B2 | 6/2008 | Holtcamp | |
| 7,396,888 B2 | 7/2008 | Razavi | |
| 7,547,754 B2 | 6/2009 | McDaniel et al. | |
| 7,572,875 B2 | 8/2009 | Jensen et al. | |
| 7,595,364 B2 | 9/2009 | Shannon et al. | |
| 7,619,047 B2 | 11/2009 | Yang et al. | |
| 7,625,982 B2 | 12/2009 | Martin et al. | |
| 7,662,894 B2 | 2/2010 | Hamed et al. | |
| 7,829,495 B2 | 11/2010 | Floyd et al. | |
| 7,855,253 B2 | 12/2010 | Shannon et al. | |
| 8,088,867 B2 | 1/2012 | Jiang et al. | |
| 8,110,518 B2 | 2/2012 | Razavi et al. | |
| 8,138,113 B2 | 3/2012 | Yang et al. | |
| 8,268,944 B2 | 9/2012 | Yang et al. | |
| 8,288,487 B2 | 10/2012 | Yang et al. | |
| 8,329,834 B2 | 12/2012 | Masino et al. | |
| 8,378,029 B2 | 2/2013 | Liu et al. | |
| 8,383,754 B2 | 2/2013 | Yang et al. | |
| 8,575,284 B2 | 11/2013 | Luo et al. | |
| 8,598,061 B2 | 12/2013 | Yang et al. | |
| 8,680,218 B1 | 3/2014 | Yang et al. | |
| 8,785,551 B2 | 7/2014 | Arriola et al. | |
| 8,815,357 B1 | 8/2014 | Inn et al. | |
| 8,846,841 B2 | 9/2014 | Yang et al. | |
| 8,940,842 B2 | 1/2015 | Yang et al. | |
| 8,957,167 B2 | 2/2015 | Hussein et al. | |
| 8,957,168 B1 | 2/2015 | Yang et al. | 526/142 |
| 9,006,367 B2 | 4/2015 | McDaniel et al. | |
| 9,078,993 B2 | 7/2015 | Stinis | |
| 9,079,993 B1 | 7/2015 | St. Jean et al. | C08F 210/16 |
| 9,096,745 B2 | 8/2015 | Lam et al. | |
| 9,163,098 B2 | 10/2015 | Cymbaluk et al. | |
| 9,181,370 B2 | 11/2015 | Sukhadia et al. | |
| 9,217,049 B2 | 12/2015 | Yang et al. | |
| 9,284,389 B2 | 3/2016 | St. Jean et al. | |
| 9,303,099 B2 | 4/2016 | Yang et al. | |
| 9,303,920 B2 | 4/2016 | Rivers et al. | |
| 9,447,265 B2 | 9/2016 | Lam et al. | |
| 9,487,607 B2 | 11/2016 | Sohn et al. | |
| 2002/0010077 A1 | 1/2002 | Lue et al. | |
| 2006/0275571 A1 | 12/2006 | Mure et al. | |
| 2012/0130032 A1 | 4/2012 | Hussein et al. | 526/131 |
| 2014/0031504 A1 | 1/2014 | Jacobsen et al. | |
| 2014/0127427 A1 | 5/2014 | Vantomme et al. | |
| 2015/0322184 A1 | 11/2015 | Hlavinka et al. | |
| 2016/0075803 A1 | 3/2016 | St. Jean et al. | |
| 2017/0015686 A1 | 1/2017 | Yang et al. | |
| 2017/0114167 A1 | 4/2017 | Holtcamp et al. | |
| 2018/0282359 A1 | 10/2018 | Crowther et al. | C07F 17/00 |
| 2018/0282443 A1 | 10/2018 | Crowther et al. | C08F 210/16 |

FOREIGN PATENT DOCUMENTS

| | | | |
|---|---|---|---|
| EP | 0 729 387 | 9/1999 | |
| EP | 2 003 166 | 12/2008 | |
| EP | 2 374 822 | 10/2011 | |
| JP | 2001-072694 | 3/2001 | C07F 17/00 |
| KR | 101132180 | 4/2012 | |
| KR | 101691628 | 1/2017 | |
| WO | 97/35891 | 10/1997 | |
| WO | 98/49209 | 11/1998 | |
| WO | 99/64476 | 12/1999 | |
| WO | 00/12565 | 3/2000 | |
| WO | 00/37513 | 6/2000 | |
| WO | 01/09200 | 2/2001 | |
| WO | 01/34664 | 5/2001 | |
| WO | 02/060957 | 8/2002 | |

(56) References Cited

FOREIGN PATENT DOCUMENTS

| WO | 2004/046214 | 6/2004 |
|---|---|---|
| WO | 2006/080817 | 8/2006 |
| WO | 2007/067259 | 6/2007 |
| WO | 2007/080365 | 7/2007 |
| WO | 2009/146167 | 12/2009 |
| WO | 2012/006272 | 1/2012 |
| WO | 2012/158260 | 11/2012 |
| WO | 2015/123168 | 8/2015 |
| WO | 2016/171807 | 10/2016 |
| WO | 2016/171810 | 10/2016 |
| WO | 2016/172099 | 10/2016 |
| WO | 2017/011073 | 1/2017 |

OTHER PUBLICATIONS

Christopher et al., "Synthesis, Structure, and Reactivity of rac-Me2Si(indenyl)2Zr(NMe2)2," Organometallics, 1996, vol. 15, No. 19, pp. 4038-4044.

Hong et al., "Immobilized Me2Si(C5Me4)(N—t—Bu)TiCl2/(nBuCp)2ZrCl2 Hybrid Metallocene Catalyst System for the Production of Poly(ethylene-co-hexene) with Pseudo-bimodal Molecular Weight and Inverse Comonomer Distribution," Polymer Engineering and Science, 2007, vol. 47, No. 2, pp. 131-139.

Kim et al., "Copolymerization of ethylene and α_olefins with combined metallocene catalysts. III. Production of polyolefins with controlled microstructures," J. Polym. Sci. Part A: Polym Chem., 2000, vol. 38, No. 9, pp. 1427-1432.

Iedema et al., "Predicting the Molecular Weight Distribution of Polyethylene for Mixed Systems with a Constrained-Geometry Metallocene Catalyst in a Semibatch Reactor," Ind. Eng. Chem. Res., 2004, vol. 43, No. 1, pp. 36-50.

Sheu, S., "Enhanced bimodal PE makes the impossible possible", http://www.tappi.org/content/06asiaplace/pdfs-english/enhanced.pdf, 2006.

Chen et al., "Modeling and Simulation of Borstar Bimodal Polyethylene Process Based on Rigorous PC-SAFT Equation of State Model", Industrial & Engineering Chemistry Research, 2014, vol. 53, No. 51, pp. 19905-19915.

Calhoun et al.—Editors, "Polymer Chemistry, Properties and Applications", Chapter 5: Molecular Characterization of Polymers, pp. 77-87.

Stadelhofer et al., "Darstellung und eigenschaften von alkylmetallcyclopentadienderivaten des aluminiums, galliums und indiums," Journal of Organometallic Chemistry, 1975, vol. 84, No. 1, pp. C1-C4.

Tian et al., "Synthesis of and Olefin Polymerization Using Tethered, ansa-Metallocene Complexes," Macromolecules, 2001, vol. 34, No. 10, pp. 3120-3122.

Leino, R. et al. (2001) "Syndiospecific Propylene Polymerization with $C_1$ Symmetric Group 4 ansa-Metallocene Catalysts," *Macromolecules*, v.34(7), pp. 2072-2082.

Hill, M. et al. (2003) "Organic Functional Group Transformations in the Periphery of a Group-4 Metallocene Complex: 2H-Pyrrole Formation at a Pendant Boron Lewis Acid," *Eur. Jrnl. Inorg. Chem.*, v.2003(19), pp. 3583-3589.

Suzuki, N. et al. (2002) "Preparation of Isospecific Metallocene Catalysts for Olefin Polymerization that are Covalently Tethered on Solid Surface," *Applied Catalysis A*, v.224(1-2), pp. 63-75.

\* cited by examiner

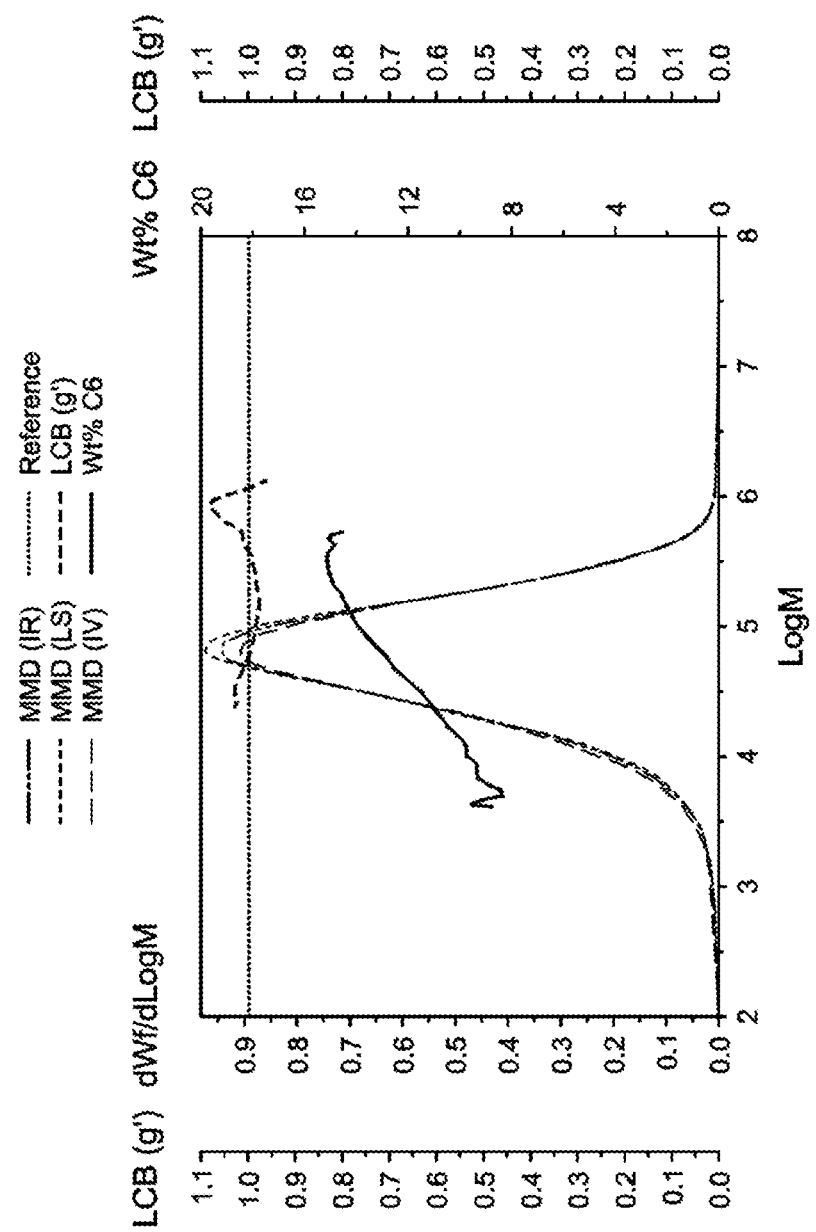

BRIDGED METALLOCENE CATALYSTS WITH A PENDANT GROUP 13 ELEMENT, CATALYST SYSTEMS CONTAINING SAME, PROCESSES FOR MAKING A POLYMER PRODUCT USING SAME, AND PRODUCTS MADE FROM SAME

PRIORITY CLAIM

This application claims priority to and the benefit of U.S. Ser. No. 62/624,549, filed Jan. 31, 2018 and is incorporated by reference in its entirety.

STATEMENT OF RELATED APPLICATIONS

This application is related to U.S. Ser. No. 62/624,558, filed Jan. 31, 2018, which is incorporated by reference in its entirety, the PCT application claiming priority thereto, PCT/US2019/014013, filed Jan. 17, 2019, and U.S. Ser. No. 16/250,624, filed Jan. 17, 2019 (entitled "Mixed Catalyst Systems Containing Bridged Metallocenes With a Pendant Group 13 Element, Processes For Making a Polymer Product Using Same, and Products Made From Same").

FIELD OF THE INVENTION

The present disclosure relates to a metallocene catalyst compound comprising first and second cyclopentadienyl rings connected by a bridging group (BG), as well as catalyst systems including the metallocene catalyst compounds, processes for making a polymer product using the catalyst system, and polymer products so made.

BACKGROUND OF THE INVENTION

This section provides background information related to the present disclosure which is not necessarily prior art.

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Low density polyethylene is generally prepared at high pressure using free radical initiators. Low density polyethylene typically has a density at about 0.916-0.930 g/cm$^3$. Typical low density polyethylene produced using free radical initiators is known in the industry as "LDPE." LDPE is also known as "branched" or "heterogeneously branched" polyethylene because of the relatively large number of long chain branches extending from the main polymer backbone. Polyethylene with a similar density that does not contain long chain branches is known as "linear low density polyethylene" ("LLDPE") and is typically produced with conventional Ziegler-Natta catalysts or with metallocene catalysts. "Linear" means that the polyethylene has few, if any, long chain branches and typically has a g'vis value of 0.97 or above, such as 0.98 or above. Polyethylenes having still greater density are the high density polyethylenes ("HDPEs"), e.g., polyethylenes having densities greater than 0.940 g/cm$^3$ and are generally prepared with Ziegler-Natta or chrome catalysts. Very low density polyethylenes ("VLDPEs") can be produced by a number of different processes yielding polyethylenes typically having a density 0.890 to 0.915 g/cm$^3$.

Copolymers of polyolefins, such as polyethylene, have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst.

A copolymer composition has a composition distribution, which refers to the distribution of comonomer in the copolymer, typically along the copolymer backbone. When the amount of comonomer varies among the copolymer molecules, the composition is said to have a "broad" composition distribution. When the amount of comonomer per 1000 carbons is similar among the copolymer molecules of different chain lengths, the composition distribution is said to be "narrow."

The composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

A composition distribution of a copolymer composition is influenced by the identity of the catalyst used to form the polyolefins of the composition. Ziegler-Natta catalysts and chromium based catalysts produce compositions with broad composition distributions, whereas metallocene catalysts typically produce compositions with narrow composition distributions.

There exists a need for catalyst systems that provide polyolefin compositions having novel combinations of comonomer content fractions and molecular weight distributions.

Useful catalysts for olefin polymerization are often based on cyclopentadienyl transition metal catalyst compounds (metallocenes) as catalyst precursors combined with activators, typically an alumoxane or with an activator containing a non-coordinating anion. A typical metallocene catalyst system includes metallocene catalyst, activator, and optional support. Supported catalyst systems are used in many polymerization processes, often in slurry or gas phase polymerization processes.

Catalysts for olefin polymerization are often based on substituted metallocenes as catalyst precursors, which are activated either with the help of an alumoxane, or with an activator containing a non-coordinating anion.

For example U.S. Pat. No. 7,829,495 discloses Me$_2$Si (fluorenyl)(3-nPr-Cp)ZrCl$_2$ and U.S. Pat. No. 7,179,876 discloses supported (nPrCp)$_2$HfMe$_2$.

Likewise, Me$_2$C(Cp)(Me$_3$SiCH$_2$—Ind)MCl$_2$ and Me$_2$C (Cp)(Me, Me$_3$SiCH$_2$—Ind)MCl$_2$, where M is Zr or Hf have been synthesized and screened for the syndiospecific polymerization of propylene; see Leino, R., Gomez, F.; Cole, A.; Waymouth, R. *Macromolecules* 2001, 34, 2072-2082.

Additional references of interest include: Hong et al. in "Immobilized Me$_2$Si(CsMe$_4$)(N-t-Bu)TiCl$_2$/(nBuCp)$_2$ZrCl$_2$ Hybrid Metallocene Catalyst System for the Production of Poly(ethylene-co-hexene) with Pseudo-bimodal Molecular Weight and Inverse Comonomer Distribution," (Polymer Engineering and Science-2007, DOI 10.1002/pen, pages 131-139, published online in Wiley InterScience (www.interscience.wiley.com), 2007 Society of Plastics Engineers); Kim, J. D. et al., *J. Polym. Sci. Part A: Polym Chem.*, 38, 1427 (2000); Idema, P. D., et al., *Ind. Eng. Chem. Res.*, 43, 36 (2004); Sheu, S., 2006, "Enhanced bimodal PE makes the impossible possible", http://www.tappi.org/content/06asiaplace/pdfs-english/enhanced.pdf; Chen et al., "Modeling and Simulation of Borstar Bimodal Polyethylene Process Based on Rigorous PC-SAFT Equation of State Model", Industrial & Engineering Chemical Research, 53, pp. 19905-19915, (2014), US 2015/0322184; and A. Calhoun et al. "Polymer Chemistry", Chapter 5, pages 77-87 and *J. Organomet. Chem.*, 1975, 84; U.S. Pat. Nos. 4,701,432; 5,032,562; 5,077,255; 5,135,526; 5,183,867; 5,382,630; 5,382,631; 5,516,848; 5,525,678; 6,069,213; 6,207,606; 6,380,311; 6,656,866; 6,828,394; 6,964,937; 6,956,094; 6,964,937; 6,995,109; 7,041,617; 7,119,153; 7,129,302; 7,141,632; 7,172,987; 7,179,876; 7,192,902; 7,199,072; 7,199,073; 7,226,886; 7,285,608; 7,312,283; 7,355,058; 7,385,015; 7,396,888; 7,547,754; 7,572,875; 7,595,364; 7,619,047; 7,625,982; 7,662,894; 7,829,495; 7,855,253; 8,088,867; 8,110,518; 8,138,113; 8,268,944; 8,288,487; 8,329,834; 8,378,029; 8,383,754; 8,575,284; 8,598,061; 8,680,218; 8,785,551; 8,815,357; 8,846,841; 8,940,842; 8,957,168; 9,006,367; 9,079,993; 9,096,745; 9,163,098; 9,181,370; 9,217,049; 9,303,099; 9,303,920; and 9,447,265; 9,487,607; U.S. Patent Application Publication Nos. 2006/275571; 2010/331505; 2012/0130032; 2014/0031504; 2014/0127427; 2015/0322184; 2015/299352; 2016/0032027; 2016/075803; 2017/0114167; 2018/0282443; 2018/0282359; PCT Publication Nos. WO 97/35891; WO 98/49209; WO 00/12565; WO 01/09200; WO 02/060957; WO 2004/046214; WO 2006/080817; WO 2007/067259; WO 2007/080365; WO 2009/146167; WO 2012/006272; WO 2012/158260; WO 2015/123168; WO 2016/171807; WO 2016/171810; and WO 2016/172099; European Publication Nos. EP 2 374 822; EP 2 003 166; EP 0 729 387; EP 0 676 418; EP 0 705 851; Korean Publication Nos. KR 101691628; and KR 101132180.

There is still a need in the art for new and improved catalyst systems for the polymerization of olefins, in order to achieve increased activity or enhanced polymer properties, to increase conversion or comonomer incorporation, or to alter comonomer distribution. There is also a need for supported catalyst systems and processes for the polymerization of olefins (such as ethylene) using such catalyst systems to provide ethylene polymers having the unique properties of high stiffness, high toughness and good processability.

SUMMARY OF THE INVENTION

This section provides a general summary of the disclosure, and is not a comprehensive disclosure of its full scope or all of its features.

One aspect of the invention relates to a metallocene catalyst compound comprising a structure represented by formula (F-MC) below:

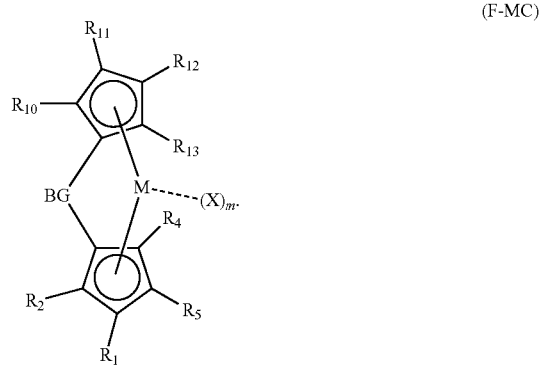

(F-MC)

The metallocene catalyst compounds of formula (F-MC) contain a first cyclopentadienyl ring with carbon atoms directly connected with $R^1$, $R^2$, $R^4$, and $R^5$, a second cyclopentadienyl ring with carbon atoms directly connected with $R^{10}$, $R^{11}$, $R^{12}$, and $R^{13}$, and a bridging group (BG) directly connecting the first and second cyclopentadienyl rings. In formula (F-MC), each of $R^4$ and $R^5$ is a hydrogen, a substituted or unsubstituted linear, branched linear, or cyclic $C_1$-$C_{30}$ hydrocarbyl group, or a substituted or unsubstituted linear, branched linear, or cyclic $C_1$-$C_{30}$ hydrosilylcarbyl group. Also in formula (F-MC), $R^1$ and $R^2$ are each independently a hydrogen or a substituted or unsubstituted linear, branched linear, or cyclic $C_1$-$C_{30}$ hydrocarbyl group, or $R^1$ and $R^2$, taken together with the carbon atoms in the first cyclopentadienyl ring to which they are directly connected, collectively form one or more substituted or unsubstituted rings annelated to the first cyclopentadienyl ring. Further in formula (F-MC), each of $R^{10}$ and $R^{11}$ is a hydrogen or a substituted or unsubstituted linear, branched linear, or cyclic $C_1$-$C_{30}$ hydrocarbyl group. Still further in formula (F-MC), $R^{12}$ and $R^{13}$ are each independently a hydrogen or a substituted or unsubstituted linear, branched linear, or cyclic $C_1$-$C_{30}$ hydrocarbyl group, or $R^{12}$ and $R^{13}$, taken together with the carbon atoms in the second cyclopentadienyl ring to which they are directly connected, collectively form one or more substituted or unsubstituted rings annelated to the second cyclopentadienyl ring. Yet further in formula (F-MC), M is a transition metal having an integer valency of v, and m is an integer equal to v-2. Even further in formula (F-MC), each X is independently a halogen, a hydride, an amide, an alkoxide, a substituted alkoxide, a sulfide, a phosphide, a diene, an amine, a phosphine, an ether, or a $C_1$-$C_{20}$ substituted or unsubstituted linear, branched, or cyclic hydrocarbyl group, or optionally two or more X moieties may together form a fused ring or ring system. Even still further in formula (F-MC), the bridging group (BG) comprises —[BA($R^{20}$)$_2$]$_n$—, wherein: n is an integer from 1 to 3; each BA, the same or different at each occurrence, is independently carbon, silicon, or germanium; and each $R^{20}$, the same or different at each occurrence, is each independently a $C_1$-$C_8$ substituted or unsubstituted linear, branched, or cyclic hydrocarbyl group or a pendant group having a formula —$R^{21}$-G13($X_2$), where each G13 is a group 13 element, each $R^{21}$ is independently a $C_1$-$C_8$ substituted or unsubstituted linear, branched, or cyclic hydrocarbyl group, and each X is defined as above; provided that at least one $R^{20}$ is a pendant group of the formula —$R^{21}$-G13($X_2$).

In some embodiments, M comprises Zr or Hf and m is 2. Additionally, or alternatively, each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide.

In some embodiments, wherein the metallocene compound has a structure represented by formula (F-MCl) below:

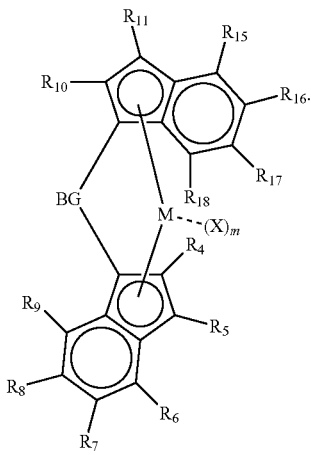

(F-MC1)

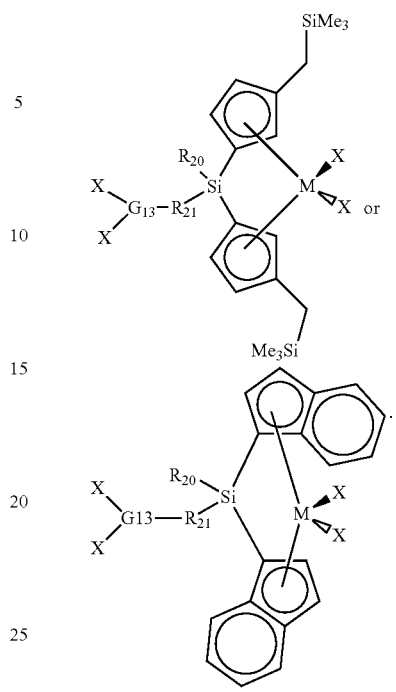

In formula (F-MC1), $R^1$ and $R^2$, taken together with the carbon atoms in the first cyclopentadienyl ring to which they are directly connected, collectively form a substituted or unsubstituted phenyl ring annelated to the first cyclopentadienyl ring. Also in formula (F-MC1), $R^{12}$ and $R^{13}$, taken together with the carbon atoms in the second cyclopentadienyl ring to which they are directly connected, collectively form a substituted or unsubstituted phenyl ring annelated to the second cyclopentadienyl ring. Further in formula (F-MC1), $R^6$, $R^7$, $R^8$, $R^9$, $R^{15}$, $R^{16}$, $R^{17}$, and $R^{18}$ are each independently a hydrogen or a substituted or unsubstituted linear, branched linear, or cyclic $C_1$-$C_6$ hydrocarbyl group.

In some embodiments of formula (F-MC1), at least eight of $R^4$, $R^5$, $R^6$, $R^7$, $R^8$, $R^9$, $R^{10}$, $R^{11}$, $R^{15}$, $R^{16}$, $R^{17}$, and $R^{18}$ are a hydrogen. Additionally or alternatively in formula (F-MC1), each of $R^4$ and $R^5$ is a hydrogen or a substituted or unsubstituted linear, branched linear, or cyclic $C_1$-$C_5$ hydrocarbyl group; each of $R^{10}$ and $R^{11}$ is a hydrogen or a substituted or unsubstituted linear, branched linear, or cyclic $C_1$-$C_8$ hydrocarbyl group; and at least ten of $R^4$, $R^5$, $R^6$, $R^7$, $R^8$, $R^9$, $R^{10}$, $R^{11}$, $R^{15}$, $R^{16}$, $R^{17}$, and $R^{18}$ are a hydrogen. Further additionally or alternatively in formula (F-MC1), M is Hf or Zr, m is 2, and each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide. Still further additionally or alternatively in formula (F-MC1), the bridging group (BG) is —[BA($R^{20}$)$_2$]—, wherein: the bridging atom, BA, is carbon or silicon; one $R^{20}$ is a $C_1$-$C_8$ substituted or unsubstituted linear, branched, or cyclic hydrocarbyl group; and the other $R^{20}$ is a pendant group having a formula —$R^{21}$-G13($X_2$), where G13 is boron or aluminum, $R^{21}$ is a $C_1$-$C_8$ substituted or unsubstituted linear, branched, or cyclic hydrocarbyl group, and each X is defined as above.

In some embodiments, the metallocene compounds can have the following structure:

In these embodiments, M can be Hf or Zr; G13 can be boron or aluminum; $R^{20}$ and $R^{21}$ can each independently be a $C_1$-$C_8$ substituted or unsubstituted linear, branched, or cyclic hydrocarbyl group; and each X can independently be a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide.

Another aspect of the invention relates to a catalyst system comprising a metallocene catalyst compound as described herein, activator, optional scavenger, and optional support.

Another aspect of the invention relates to a catalyst system comprising a metallocene catalyst compound as described herein, activator, support, and optional scavenger.

Another aspect of the invention relates to a catalyst system comprising a metallocene catalyst compound as described herein and a non-coordinating anion type activator.

In some embodiments, the catalyst system comprises activator selected from the group consisting of N,N-dimethylanilinium tetrakis(perfluorophenyl)borane, N,N-dimethylanilinium tetrakis(perfluoronaphthyl)borane, N,N-dimethylanilinium tetrakis(perfluorobiphenyl)borane, N,N-dimethylanilinium tetrakis(3,5-bis(trifluoromethyl)perfluorophenyl)borane, N,N-dimethylanilinium tetrakis(perfluorophenyl)aluminate, N,N-dimethylanilinium tetrakis(perfluoronaphthyl)aluminate, triphenylcarbenium tetrakis(perfluoronaphthyl)borane, triphenylcarbenium tetrakis(perfluorobiphenyl)borane, triphenylcarbenium tetrakis(3,5-bis(trifluoromethyl)perfluorophenyl)borane, triphenylcarbenium tetra(perfluorophenyl)borane, triphenylcarbenium tetrakis(perfluorophenyl)aluminate, triphenylcarbenium tetrakis(perfluoronaphthyl)aluminate, [Ph$_3$C$^+$][B(C$_6$F$_5$)$_4^-$], [Me$_3$NH$^+$][B(C$_6$F$_5$)$_4^-$], 1-(4-(tris(pentafluorophenyl)borane)-2,3,5,6-tetrafluorophenyl)pyrrolidinium, 4-(tris(pentafluorophenyl)borane)-2,3,5,6-tetrafluoropyridine, and combinations thereof. In some embodiments, the catalyst system can further comprise a second activator, preferably selected from the above group.

Still another aspect of the invention relates to a process for making a polymeric product. The process can comprise contacting a feed containing a $C_2$ to $C_{40}$ alpha-olefin with a catalyst system as described herein in a polymerization reactor under polymerization conditions to effect a polymerization reaction to obtain a polymerization reaction mixture, and obtaining a polymeric product from the polymerization reaction mixture.

In some embodiments, the feed can comprise a first content of ethylene ($C_2$) being greater than 50 mol % and a remainder content of $C_3$ to $C_{40}$ alpha-olefins, relative to a total content of alpha-olefins in the feed. In some such embodiments, the remainder $C_3$ to $C_{40}$ content can constitute at least 75 mol % $C_6$-$C_{12}$ linear alpha-olefins, relative to a total amount of $C_3$ to $C_{40}$ alpha-olefins in the feed. Additionally or alternatively in these embodiments, the first content can be from 60 mol % to 90 mol % and the remainder content is from 10 mol % to 40 mol %.

In particular embodiments, the polymerization reaction can result in the polymer product exhibiting, as measured by GPC: a number average molecular weight (Mn) from 7000 g/mol to 70000 g/mol; a polydispersity index (PDI) from 4.1 to 9.0; and optionally an average content of copolymerized $C_3$ to $C_{40}$ alpha-olefins, relative to a total content of alpha-olefins copolymerized in the polymer product, that increases for each quartile of increasing molecular weight distribution (MWD) of the polymer product. Additionally, or alternatively, the polymerization reaction can result in the polymer product exhibiting, as measured by GPC, a span of content of copolymerized $C_3$ to $C_{40}$ alpha-olefins across a molecular weight distribution (MWD) of the polymer product that is no greater than 35% above or below a mean content of copolymerized $C_3$ to $C_{40}$ alpha olefins across the MWD of the polymer product, where "span" is defined as range of contents starting with average non-$C_2$ content of lowest decile molecular weights to average non-$C_2$ content of highest decile molecular weights in the product Mw/Mn.

Yet another aspect of the invention relates to a polymeric product made by the processes described herein and/or from an alpha-olefin feed comprising ethylene ($C_2$) monomer and a $C_3$ to $C_{40}$ alpha-olefin comonomer. In advantageous embodiments, the polymer product can exhibit, as measured by GPC: an Mn from 7000 g/mol to 70000 g/mol; a PDI from 4.1 to 9.0; an average content of polymerized $C_3$ to $C_{40}$ alpha-olefin comonomer, relative to a total content of alpha-olefin monomers and comonomers polymerized in the polymer product, that increases for each quartile of increasing MWD of the polymer product; and optionally but preferably a span of content of copolymerized $C_3$ to $C_{40}$ alpha-olefins across the MWD of the polymer product that is no greater than 35% above or below a mean content of copolymerized $C_3$ to $C_{40}$ alpha-olefins across the MWD of the polymer product. Additionally or alternatively, the polymer product can exhibit a melt index ratio (MIR) from 40 to 150.

In broad terms, aspects of this invention relate to novel catalyst compounds, methods for polymerizing olefins comprising contacting such catalyst compounds with an activator and one or more monomers, and polymer compositions produced by the methods described herein, inter alia.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The FIGURE shows a graphic representation of a 4D GPC analysis of an ethylene-hexene copolymer as described in Example 19.

DETAILED DESCRIPTION

Definitions

All numerical values within the detailed description and the claims herein are modified by "about" or "approximately" the indicated value, and take into account experimental error and variations that would be expected by a person having ordinaryskill in the art.

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

The term "alkyl" or "alkyl group" interchangeably refers to a saturated hydrocarbyl group consisting of carbon and hydrogen atoms. An alkyl group can be linear, branched linear, cyclic, or substituted cyclic.

The term "cycloalkyl" or "cycloalkyl group" interchangeably refers to a saturated hydrocarbyl group wherein the carbon atoms form one or more ring structures.

The term "alkenyl" or "alkenyl group" interchangeably refers to a linear unsaturated hydrocarbyl group comprising a C=C bond therein.

The term "cycloalkenyl" or "cycloalkenyl group" interchangeably refers to cyclic hydrocarbyl group comprising a C=C bond in the ring.

The term "aryl" or "aryl group" interchangeably refers to a hydrocarbyl group comprising an aromatic ring structure therein and the substituted variants thereof, including but not limited to, phenyl, 2-methyl-phenyl, xylyl, 4-bromo-xylyl, etc. Likewise "heteroaryl" means an aryl group where a ring carbon atom (or two or three ring carbon atoms) has been replaced with a heteroatom, such as N, O, and/or S (alternatively, in some embodiments, including Si). As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a substituted group means such a group in which at least one atom is replaced by a different atom or a group. Thus, a substituted alkyl group can be an alkyl group in which at least one hydrogen atom is replaced by a hydrocarbyl group, a halogen, any other non-hydrogen group, and/or a least one carbon atom and hydrogen atoms bonded thereto is replaced by a different group.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The terms "hydrocarbyl radical," "hydrocarbyl group," or "hydrocarbyl" interchangeably refers to a group consisting of hydrogen and carbon atoms only. A hydrocarbyl group can be saturated or unsaturated, linear or branched, cyclic or acyclic, aromatic or non-aromatic.

For purposes of this invention and claims thereto, the term "substituted" means that a hydrogen group has been replaced with a heteroatom, or a heteroatom containing group. For example, substituted hydrocarbyl radicals are radicals in which at least one hydrogen atom has been substituted with a heteroatom or heteroatom containing group, preferably with at least one functional group, such as halogen (Cl, Br, I, F), $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one heteroatom has been inserted within the hydrocarbyl radical, such as halogen (Cl, Br, I, F), O, S, Se, Te, $NR*$, $PR*$, $AsR*$, $SbR*$, $BR*$, $SiR*_2$, $GeR*_2$, $SnR*_2$, $PbR*_2$, and the like, where $R*$ is, independently, hydrogen or a hydrocarbyl.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Analogous to "hydrocarbyl," the terms "hydrosilylcarbyl radical," "hydrosilylcarbyl group," or "hydrosilylcarbyl" interchangeably refers to a group consisting of hydrogen, carbon, and silicon atoms only. A hydrosilylcarbyl group can be saturated or unsaturated, linear or branched, cyclic or acyclic, aromatic or non-aromatic, and with the silicon atom being within and/or pendant to the cyclic/aromatic rings.

The term "Cn" group or compound refers to a group or a compound comprising carbon atoms at total number thereof of n. Thus, a "Cm-Cn" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

For purposes of this invention and claims thereto, the terms "alkoxy" and "alkoxide" mean an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated.

The term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched linear, or cyclic.

The term "alpha-olefin" refer to an olefin having a terminal carbon-to-carbon double bond in the structure thereof $((R^1R^2)$—$C$=$CH_2$, where $R^1$ and $R^2$ can be independently hydrogen or any hydrocarbyl group; preferably $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group. Non-limiting examples of α-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on. An oligomer is a polymer having a low molecular weight, such as an Mn of 21000 g/mol or less (preferably 10000 g/mol or less), and/or a low number of mer units, such as 100 mer units or less (preferably 75 mer units or less). As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

In the present disclosure, all molecular weight data are in the unit of g·mol$^{-1}$. Molecular weight of oligomer or polymer materials and distribution thereof in the present disclosure can be measured by using gel permeation chromatography procedure described below.

NMR spectroscopy provides key structural information about the synthesized polymers. Proton NMR ($^1$H-NMR) analysis may be an alternative method other than GPC to determine the molecular weight of oligomer or polymer materials. However, molecular weights of oligomer or polymer materials measured by $^1$H-NMR herein represent a number average molecular weight (Mn).

The terms "catalyst" and "catalyst compound" are defined to mean a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material. A polymerization catalyst system is a catalyst system that can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers. An "anionic ligand" is a negatively charged ligand which donates one or more pairs of electrons to a metal ion. A "neutral donor ligand" is a neutrally charged ligand which donates one or more pairs of electrons to a metal ion.

Noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borane, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA can coordinate weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. Activators containing non-coordinating anions can also be referred to as stoichiometric activators. A stoichiometric activator can be either neutral or ionic. The terms ionic activator and stoichiometric ionic activator can be used interchangeably. Likewise, the terms neutral stoichiometric activator and Lewis acid activator can be used interchangeably. The term non-coordinating anion activator includes neutral stoichiometric activators, ionic stoichiometric activators, ionic activators, and Lewis acid activators.

A scavenger is a compound typically added to facilitate oligomerization or polymerization by scavenging impurities. Some scavengers may also act as activators and may be referred to as co-activators. A co-activator, that is not a scavenger, may be used in conjunction with an activator in order to form an active catalyst. In some embodiments, a co-activator can be pre-mixed with the catalyst compound to form an alkylated catalyst compound.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported herein as the mass of product polymer (P) produced per mass of catalyst (cat) used (gP/gcat, or gPgcat$^{-1}$).

The term "orthogonal," as applied to a molecular weight distribution (MWD) of a copolymeric composition made by polymerizing a primary (predominant) monomer and a secondary (minority) comonomer, means that the average content of polymerized comonomer units, relative to a total content of polymerized monomer plus comonomer units in the polymer product, increases for each quartile of increasing MWD of the polymer product. In other words, an orthogonal comonomer distribution of a copolymer composition exhibits a lower comonomer incorporation level in the lower molecular weight end of the distribution and a higher comonomer incorporation levels in the higher molecular weight end of the distribution, as well as a generally increasing trend in comonomer incorporation level from the lower molecular weight portion of the distribution to the higher molecular weight portion of the distribution. For clarity, the FIGURE characterizes a copolymer product having an orthogonal comonomer distribution.

The term "span," as applied to a molecular weight distribution (MWD) of a copolymeric composition made by polymerizing a primary (predominant) monomer and a secondary (minority) comonomer, represents the greatest percentage difference between the lowest and highest average contents of polymerized comonomer units for each decile of the MWD and can be expressed either as that difference or as a percentage relative to the average content of polymerized comonomer units for the entire distribution (i.e., the mean polymerized comonomer content). For example, in an MWD where: the decile with the lowest value of average polymerized comonomer content is 6.5 wt % comonomer; the decile with the highest value of average polymerized comonomer content is 11.5 wt % comonomer; and the mean polymerized comonomer content is 9.5 wt %, the span of comonomer contents can be expressed either as 5 wt % or as ranging from 32% (3/9.5) below to 21% (2/9.5) above the mean polymerized comonomer content.

Melt index (MI), also referred to as I2 and reported in g/10 min, can be determined according to ASTM D1238, ~190° C., ~2.16 kg load. High load melt index (HLMI), also referred to as I21 and also reported in g/10 min, can be determined according to ASTM D1238, ~190° C., ~21.6 kg load. Melt index ratio (MIR) is defined herein as HLMI divided by MI, each individually as determined by ASTM D1238.

In the present disclosure, any metallocene compound may have one or more optical isomers. All metallocene compound identified herein by name or structure shall include all possible optical isomers thereof and mixtures of any such optical isomers. For example, metallocene compound $Me_2Si$ $(Me_4Cp)(3-PrInd)ZrMe_2$ shall include the following two optical isomers and mixtures thereof, even if only one structure is given when it is described:

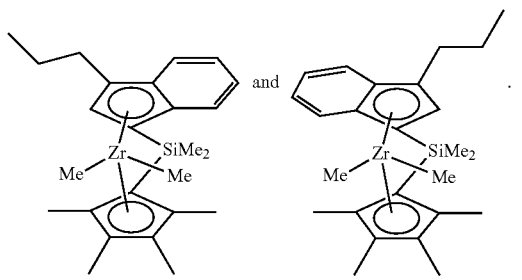

Unless specified otherwise, the term "substantially free of" with respect to a particular component means the concentration of that component in the relevant composition is no greater than 10 mol % (such as no greater than 5 mol %, no greater than 3 mol %, no greater than 1 mol %, or about 0%, within the bounds of the relevant measurement framework), based on the total quantity of the relevant composition.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid, as described in J. Vladimir Oliveira, C. Dariva, and J. C. Pinto, *Ind. Eng. Chem. Res.* 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, less than 1 wt %, or approximately 0 wt %.

The following abbreviations may be used through this specification: Me is methyl, Ph is phenyl, Et is ethyl, Pr is propyl, iPr is isopropyl, nPr is normal propyl, Bu is butyl, iBu is isobutyl, sBu is sec-butyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz or Bn are interchangeably benzyl, THF is tetrahydrofuran, RT is room temperature (i.e., approximately 20-25° C.), tol is toluene, and Cp is a common abbreviation for cyclopentadiene or cyclopentadienyl.

As used herein, a "lubricant" refers to a substance that can be introduced between two or more moving surfaces and lower the level of friction between two adjacent surfaces moving relative to each other. A lubricant "base stock" is a material, typically a fluid at the operating temperature of the lubricant, used to formulate a lubricant by admixing it with other components. Non-limiting examples of base stocks suitable in lubricants include API Group I, Group II, Group III, Group IV, Group V and Group VI base stocks. Fluids derived from Fischer-Tropsch process or Gas-to-Liquid ("GTL") processes are examples of synthetic base stocks useful for making modern lubricants. GTL base stocks and processes for making them can be found, e.g., in PCT Publication No. WO 2005/121280 and in U.S. Pat. Nos. 7,344,631; 6,846,778; 7,241,375; and 7,053,254.

All kinematic viscosity values in the present disclosure are as determined according to ASTM D445. Kinematic viscosity at ~100° C. is reported herein as KV100, and kinematic viscosity at ~40° C. is reported herein as KV40. Unit of all KV100 and KV40 values herein is cSt, unless otherwise specified.

All viscosity index (VI, sometimes abbreviated as g'vis) values in the present disclosure are as determined according to ASTM D2270.

All Noack volatility (NV) values in the present disclosure are as determined according to ASTM D5800 unless specified otherwise. Units of all NV values are wt %, unless otherwise specified.

I. CATALYST SYSTEM

I.1 Metallocene Compound(s)

The initial part to a catalyst system described herein is a metallocene compound. The metallocene compound used in the process of the present disclosure for making oligomeric or polymeric products generally has a structure represented by formula (F-MC) below comprising a first cyclopentadienyl ring with carbon atoms directly connected with $R^1$, $R^2$, $R^4$, and $R^5$, and a second cyclopentadienyl ring with carbon atoms directly connected with $R^{10}$, $R^{11}$, $R^{12}$, and $R^{13}$, and a bridging group (BG) directly connecting the first and second cyclopentadienyl rings

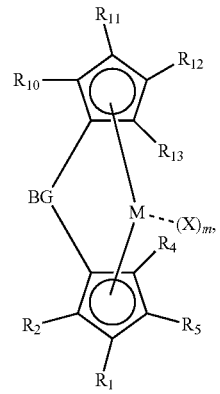

(F-MC)

wherein:

each of $R^4$ and $R^5$ is a hydrogen, a substituted or unsubstituted linear, branched linear, or cyclic $C_1$-$C_{30}$ (e.g., $C_1$-$C_{20}$, $C_1$-$C_{12}$, $C_1$-$C_{10}$, $C_1$-$C_8$, $C_1$-$C_6$, or $C_1$-$C_4$) hydrocarbyl group, or a substituted or unsubstituted linear, branched linear, or cyclic $C_1$-$C_{30}$ (e.g., $C_1$-$C_{20}$, $C_1$-$C_{12}$, $C_1$-$C_{10}$, $C_1$-$C_8$, $C_1$-$C_6$, or $C_1$-$C_4$) hydrosilylcarbyl group; $R^1$ and $R^2$ are each independently a hydrogen or a substituted or unsubstituted linear, branched linear, or cyclic $C_1$-$C_{30}$ (e.g., $C_1$-$C_{20}$, $C_1$-$C_{12}$, $C_1$-$C_{10}$, $C_1$-$C_8$, $C_1$-$C_6$, or $C_1$-$C_4$) hydrocarbyl group, or $R^1$ and $R^2$, taken together with the carbon atoms in the first cyclopentadienyl ring to which they are directly connected, collectively form one or more substituted or unsubstituted rings (e.g., unsubstituted aromatic rings, substituted aromatic rings, unsubstituted heteroaromatic rings, or substituted heteroaromatic rings) annelated to the first cyclopentadienyl ring;

each of $R^{10}$ and $R^{11}$ is a hydrogen or a substituted or unsubstituted linear, branched linear, or cyclic $C_1$-$C_{30}$ (e.g., $C_1$-$C_{20}$, $C_1$-$C_{12}$, $C_1$-$C_{10}$, $C_1$-$C_5$, $C_1$-$C_6$, or $C_1$-$C_4$) hydrocarbyl group;

$R^{12}$ and $R^{13}$ are each independently a hydrogen or a substituted or unsubstituted linear, branched linear, or cyclic $C_1$-$C_{30}$ (e.g., $C_1$-$C_{20}$, $C_1$-$C_{12}$, $C_1$-$C_{10}$, $C_1$-$C_8$, $C_1$-$C_6$, or $C_1$-$C_4$) hydrocarbyl group, or $R^{12}$ and $R^{13}$, taken together with the carbon atoms in the second cyclopentadienyl ring to which they are directly connected, collectively form one or more substituted or unsubstituted rings (e.g., unsubstituted aromatic rings, substituted aromatic rings, unsubstituted heteroaromatic rings, or substituted heteroaromatic rings) annelated to the second cyclopentadienyl ring;

M is a transition metal having an integer valency of v;

each X is independently a halogen, a hydride, an amide, an alkoxide, a substituted alkoxide, a sulfide, a phosphide, a diene, an amine, a phosphine, an ether, or a $C_1$-$C_{20}$ (e.g., $C_1$-$C_{16}$, $C_1$-$C_{12}$, $C_1$-$C_{10}$, $C_1$-$C_8$, $C_1$-$C_6$, or $C_1$-$C_4$) substituted or unsubstituted linear, branched, or cyclic hydrocarbyl group, or optionally two or more X moieties may together form a fused ring or ring system (comprising, e.g., one or more unsubstituted aromatic rings, one or more substituted aromatic rings, one or more unsubstituted heteroaromatic rings, one or more substituted heteroaromatic rings, one or more unsubstituted cycloalkyl rings, one or more substituted cycloalkyl rings, one or more unsubstituted cycloalkenyl rings, one or more substituted cycloalkenyl rings, one or more unsubstituted heterocycloalkyl rings, one or more substituted heterocycloalkyl rings, one or more unsubstituted heterocycloalkenyl rings, or one or more substituted heterocycloalkenyl rings);

m is an integer equal to v-2; and the bridging group (BG) comprises —$[BA(R^{20})_2]_n$—, wherein: n is an integer from 1 to 3; each bridging atom, BA, the same or different at each occurrence, is independently carbon, silicon, or germanium; and each $R^{20}$, the same or different at each occurrence, is each independently a $C_1$-$C_8$ (e.g., $C_1$-$C_6$, $C_1$-$C_4$, or $C_1$-$C_2$) substituted or unsubstituted linear, branched, or cyclic hydrocarbyl group or a pendant group having a formula —$R^{21}$-G13($X_2$), where each G13 is a group 13 element, each $R^{21}$ is independently a $C_1$-$C_8$ (e.g., $C_1$-$C_6$, $C_1$-$C_4$, or $C_1$-$C_2$) substituted or unsubstituted linear, branched, or cyclic hydrocarbyl group, and each X is defined as above; provided that at least one $R^{20}$ is a pendant group of the formula —$R^{21}$-G13($X_2$).

In some embodiments, preferred examples of $C_1$-$C_{20}$ and/or $C_1$-$C_{30}$ substituted or unsubstituted linear, branched, or cyclic hydrocarbyl groups can include, but are not necessarily limited to: methyl, ethyl, n-propyl, isopropyl, n-butyl, 1-methylpropyl, 1-ethylethyl, n-pentyl, 1-methylpentyl, 1-ethylpropyl, 1-hexyl, 1-methylpentyl, 1-ethylbutyl, 1-propylpropyl, optionally substituted cyclohexyl, optionally substituted phenyl, optionally substituted benzyl, and the like, and any ethylenically unsaturated group that can be derived from them by eliminating one available hydrogen group from each of two adjacent carbon atoms therein.

In some embodiments, M comprises, consists essentially of, or is Ti, Zr, and/or Hf. In a preferred embodiment, M comprises, consists essentially of, or is Zr and/or Hf. In some embodiments, the valency of the transition metal M is 4, and thus m is 2.

In some embodiments, each X is independently a halogen or a substituted or unsubstituted linear, branched linear, or cyclic $C_1$-$C_{12}$ (e.g., $C_1$-$C_{10}$, $C_1$-$C_8$, $C_1$-$C_6$, or $C_1$-$C_4$) hydrocarbyl group, e.g., a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide.

In some embodiments, the metallocene compound has a structure represented by formula (F-MC1) below:

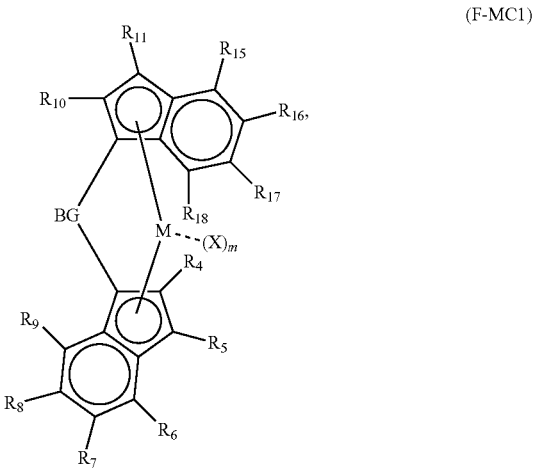

(F-MC1)

such that:

$R^1$ and $R^2$, taken together with the carbon atoms in the first cyclopentadienyl ring to which they are directly connected, collectively form a substituted or unsubstituted phenyl or naphthyl ring annelated to the first cyclopentadienyl ring; and $R^{12}$ and $R^{13}$, taken together with the carbon atoms in the second cyclopentadienyl ring to which they are directly connected, collectively form a substituted or unsubstituted phenyl or naphthyl ring annelated to the second cyclopentadienyl ring. In some embodiments, $R^6$, $R^7$, $R^8$, $R^9$, $R^{15}$, $R^{16}$, $R^{17}$, and $R^{18}$ are each independently a hydrogen or a substituted or unsubstituted linear, branched linear, or cyclic $C_1$-$C_6$ (e.g., $C_1$-$C_4$ or $C_1$-$C_2$) hydrocarbyl group.

In some embodiments, at least two (e.g., at least three or all four) of the four phenyl ring carbons not connected to the first cyclopentadienyl ring are connected to a hydrogen. Additionally or alternatively in some embodiments, at least two (e.g., at least three or all four) of the four phenyl ring carbons not connected to the second cyclopentadienyl ring are connected to a hydrogen. Further additionally or alternatively in some embodiments, at least six (e.g., at least 8, at least 9, at least 10, at least 11, or all 12) of $R^4$, $R^5$, $R^6$, $R^7$, $R^8$, $R^9$, $R^{10}$, $R^{11}$, $R^{15}$, $R^{16}$, $R^{17}$, and $R^{18}$ are a hydrogen. Still further additionally or alternatively, in some embodiments, one, some, or all of the following may be true of compounds according to formula F-MC1 above: each of $R^4$ and $R^5$ is a hydrogen or a substituted or unsubstituted linear, branched linear, or cyclic $C_1$-$C_8$ (e.g., $C_1$-$C_6$, $C_1$-$C_4$, or $C_1$-$C_2$) hydrocarbyl group; each of $R^{10}$ and $R^{11}$ is a hydrogen or a substituted or unsubstituted linear, branched, or cyclic $C_1$-$C_8$ (e.g., $C_1$-$C_6$, $C_1$-$C_4$, or $C_1$-$C_2$) hydrocarbyl group; M is Hf or Zr; m is 2; each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide; and the bridging group (BG) is —[BA($R^{20}$)$_2$]—, such that: the bridging atom, BA, is carbon or silicon; one $R^{20}$ is a $C_1$-$C_8$ (e.g., $C_1$-$C_6$, $C_1$-$C_4$, or $C_1$-$C_2$) substituted or unsubstituted linear, branched, or cyclic hydrocarbyl group; and the other $R^{20}$ is a pendant group having a formula —$R^{21}$-G13($X_2$), where G13 is boron or aluminum, $R^{21}$ is a $C_1$-$C_8$ (e.g., $C_1$-$C_6$, $C_1$-$C_4$, or $C_1$-$C_2$) substituted or unsubstituted linear, branched, or cyclic hydrocarbyl group, and each X is defined as above.

In a preferred embodiment, the metallocene compound is represented by the formula:

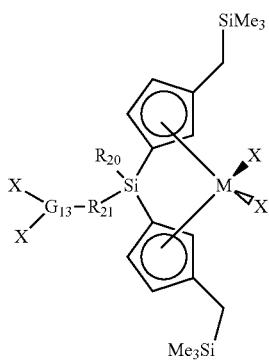

where M is Hf, each X attached to M is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide (preferably Me or OC$_6$F$_5$); each X attached to G$_{13}$M is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide (preferably iBu); G13 is Al or B, and $R^{21}$ and $R^{20}$ are independently a $C_1$ to $C_8$ alkyl, such as Me or Et.

In some embodiments, the metallocene compound can have the following structure:

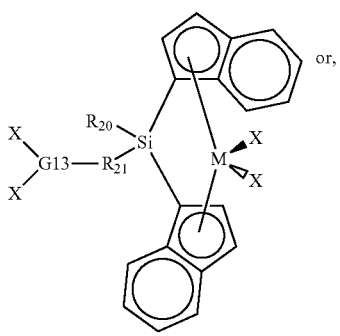

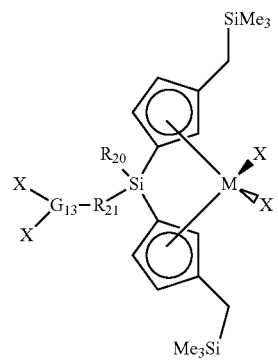

wherein:

M is Hf or Zr;

each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide;

$R^{20}$ and $R^{21}$ are each independently a $C_1$-$C_8$ (e.g., $C_1$-$C_6$, $C_1$-$C_4$, or $C_1$-$C_2$) substituted or unsubstituted linear, branched, or cyclic hydrocarbyl group; and G13 is boron or aluminum.

Particularly desirable metallocene compounds useful for the process of the present disclosure include the following compounds and their optical isomers (not shown):

Compound I-1: (Me)(iBu$_2$AlEt)Si(3-CH$_2$SiMe$_3$Cp)$_2$HfMe$_2$;

Compound I-2: (Me)(iBu$_2$AlEt)Si(3-CH$_2$SiMe$_3$Cp)$_2$Hf(OC$_6$F$_5$)$_2$;

Compound I-3: (Me)((C$_6$F$_5$)$_2$B-Et)Si(3-CH$_2$SiMe$_3$Cp)$_2$HfMe$_2$;

Compound I-4: (Me)((C$_6$F$_5$)$_2$B-Et)Si(3-CH$_2$SiMe$_3$Cp)$_2$Hf(OC$_6$F$_5$)$_2$;

Compound I-5: (Me)(iBu$_2$AlEt)Si(Ind)$_2$ZrMe$_2$;

Compound I-6: (Me)(iBu$_2$AlEt)Si(Ind)$_2$Zr(OC$_6$F$_5$)$_2$;

Compound I-7: (Me)((C$_6$F$_5$)$_2$BEt)Si(Ind)$_2$ZrMe$_2$; and

Compound I-8: (Me)((C$_6$F$_5$)$_2$BEt)Si(Ind)$_2$Zr(OC$_6$F$_5$)$_2$.

I-5

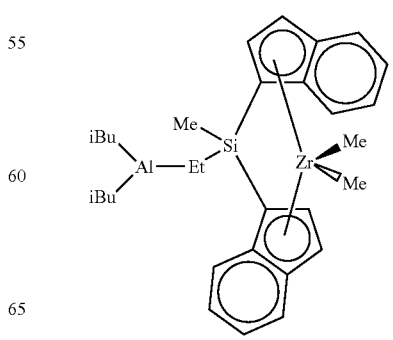

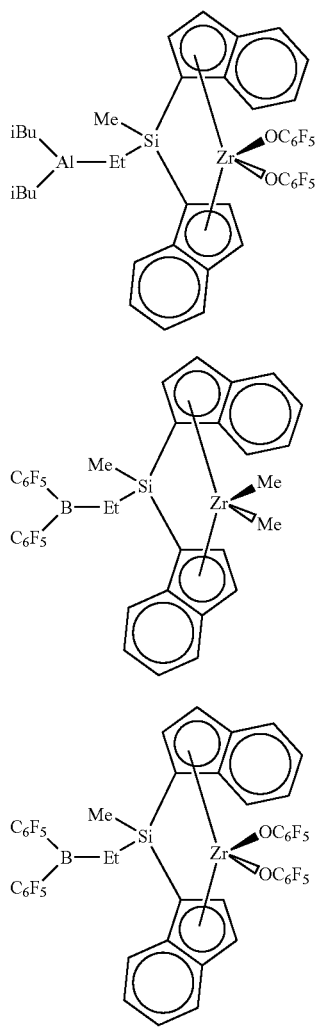

Metallocene compounds generally can be synthesized by using typical chemical reagents (e.g., halides of hafnium, zirconium, titanium) and intermediates (such as ligands containing one or two substituted or unsubstituted Cp rings, substituted or unsubstituted annelated Cp ring such as indenyl rings, and the like) that are commercially available, and following typical reaction schemes exemplified in various synthesis descriptions, e.g., as described in the Example sections of U.S. Provisional Application Nos. 62/477,683 (published as US 2018/0282443) and 62/477,706 (published as US 2018/0282359), the contents of each of which are hereby incorporated by reference.

In some embodiments, two or more different catalyst compounds may be present in the catalyst system used herein. In some embodiments, two or more different catalyst compounds are present in the reaction zone where the process(es) described herein occur. When two metallocene compound based catalysts are used in one reactor as a mixed catalyst system, the metallocene compounds can preferably be chosen to be compatible. A simple screening method such as by $^1H$ or $^{13}C$ NMR, known to those of ordinary skill in the art, can be used to determine which metallocene compounds are compatible. It is preferable to use the same activator for the metallocene compounds, however, two different activators, such as a non-coordinating anion activator and an alumoxane, can be used in combination, if desired. If one or more metallocene compounds contain an X ligand which is not a hydride, hydrocarbyl, or substituted hydrocarbyl, then the alumoxane is typically contacted with the metallocene compound(s) prior to addition of the non-coordinating anion activator.

The two metallocene compounds (pre-catalysts) may be used in any ratio. Preferred molar ratios of (A) metallocene compound to (B) metallocene compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen can depend inter alia on the exact pre-catalysts chosen, the method of activation, and the end product desired. In a particular embodiment, when using the two pre-catalysts, where both are activated with the same activator, useful mole percents, based upon the molecular weight of the pre-catalysts, can be 10 to 99.9% A to 0.1 to 90% B, e.g., 25 to 99% A to 0.5 to 50% B, 50 to 99% A to 1 to 25% B, or 75 to 99% A to 1 to 10% B.

I.2 Activators and Activation of the Metallocene Compound

An additional component of a catalyst system described herein may be an activator. The terms "cocatalyst" and "activator" are used herein interchangeably and are defined to be any compound which can activate any one of the catalyst compounds described above by converting the neutral catalyst compound to a catalytically active catalyst compound cation.

After the metallocene compounds or complexes described above have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically comprises a metallocene compound as described above and an activator. Non-limiting activators, for example, include alumoxanes, aluminum alkyls, ionizing activators, which may be neutral or ionic, and conventional-type cocatalysts. Exemplary activators may include alumoxane compounds such as methylalumoxane, modified alumoxane compounds such as modified methylalumoxane, and ionizing anion precursor compounds that abstract a reactive, σ-bound, metal ligand making the metal complex cationic and providing a charge-balancing noncoordinating or weakly coordinating anion, as well as combinations thereof. Additionally or alternatively, activators may include aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum, or the like, as well as a combination thereof.

A co-activator is a compound capable of alkylating the transition metal complex, such that when used in combination with an activator, an active catalyst can be formed. Co-activators can include Lewis acid activators and can sometimes be used in combination with activators and ionic activators when the pre-catalyst is not a dihydrocarbyl or dihydride complex. Sometimes co-activators may also be used as scavengers to deactivate impurities in feed or reactors. Activators and co-activators may be labelled interchangeably, as the determination of which is an activator and which is a co-activator can sometimes be arbitrary.

A typical activator-to-catalyst ratio, e.g., all-activators-to-catalyst ratio, is approximately a 1:1 molar ratio. Activator-to-catalyst ratios can, nevertheless, range from 0.1:1 to 100:1, alternatively from 0.5:1 to 200:1, alternatively from 1:1 to 500:1, or alternatively from 1:1 to 1000:1. A particularly useful activator-to-catalyst ratio range can be from 0.5:1 to 10:1 or from 1:1 to 5:1.

I.2.A. Alumoxane Activators

In one embodiment, alumoxane activators are utilized as an activator in the catalyst system. Alumoxanes are generally oligomeric compounds containing —Al($R^1$)—O-subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, substituted alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

I.2.B. Non Coordinating Anion Activators

A noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borane, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl)ammonium tetrakis(pentafluorophenyl)borane, a tris (perfluorophenyl)boron metalloid precursor or a tris(perfluoronaphthyl)boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

The catalyst systems of this invention can include at least one non-coordinating anion (NCA) activator. In some embodiments, boron containing NCA activators can be used, represented by the formula: $Z_d^+$ ($A^{d-}$), wherein: Z is (L-H) or a reducible Lewis acid; L is a neutral Lewis base; H is hydrogen; (L-H) is a Bronsted acid; and $A^{d-}$ is a boron-containing non-coordinating anion having the charge d−, with d being 1, 2, or 3.

The cation component, $Z_d^+$ may include Bronsted acids such as protons or protonated Lewis bases or reducible Lewis acids capable of protonating or abstracting a moiety, such as an alkyl or aryl, from the transition metal catalyst precursor, resulting in a cationic transition metal species.

The activating cation $Z_d^+$ may additionally or alternatively be a moiety such as silver, tropylium, carboniums, ferroceniums and mixtures, preferably carboniums and ferroceniums. In some embodiments, $Z_d^+$ is triphenylcarbonium. In particular embodiments, reducible Lewis acids can be any triaryl carbonium (where the aryl can be substituted or unsubstituted, such as those represented by the formula: ($Ar_3C$)$^+$, where Ar is aryl or aryl substituted with a heteroatom, a $C_1$ to $C_{40}$ hydrocarbyl, or a substituted $C_1$ to $C_{40}$ hydrocarbyl), such as where Z comprises ($Ph_3C$), with each Ph being independently an unsubstituted phenyl or a phenyl substituted with one or more $C_1$ to $C_{40}$ hydrocarbyls, such as one or more substituted or unsubstituted $C_1$ to $C_{20}$ alkyls or aromatics.

When $Z_d^+$ is the activating cation (L-H)$_d^+$, it can preferably be a Bronsted acid, capable of donating a proton to the transition metal catalytic precursor resulting in a transition metal cation, including ammoniums, oxoniums, phosphoniums, silyliums, and mixtures thereof, e.g., ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula [$M^{k+}Q_n$]$^{d-}$, wherein k is 1, 2, or 3; n is 1, 2, 3, 4, 5, or 6 (preferably 1, 2, 3, or 4); n−k=d; M is a group 13 element, preferably boron or aluminum, and Q is independently a hydride, bridged or unbridged dialkylamido, halide, alkoxide, substituted alkoxide, aryloxide, substituted aryloxide, hydrocarbyl, substituted hydrocarbyl, halocarbyl, substituted halocarbyl, and halosubstituted-hydrocarbyl radicals, said Q having up to 20 carbon atoms, with the proviso that in not more than 1 occurrence is Q a halide. In some embodiments, each Q is a fluorinated hydrocarbyl group having 1 to 20 carbon atoms. In preferred embodiments, each Q is a fluorinated aryl group, such as a perfluorinated aryl group. Examples of suitable $A^{d-}$ may additionally or alternatively include diboron compounds, such as disclosed in U.S. Pat. No. 5,447,895, which is fully incorporated herein by reference.

Illustrative, but not limiting, examples of boron compounds that may be used as an activating cocatalyst can include the compounds described as (and particularly those specifically listed as) activators in U.S. Pat. No. 8,658,556, which is incorporated by reference herein.

In some embodiments, the activator can comprise, consist essentially of, or be one or more of a trialkylammonium tetrakis(pentafluorophenyl)borane, an N,N-dialkylanilinium tetrakis(pentafluorophenyl)borane, N,N-dimethyl-(2,4,6-trimethylanilinium) tetrakis(pentafluorophenyl)borane, a trialkylammonium tetrakis(2,3,4,6-tetrafluorophenyl)borane, an N,N-dialkylanilinium tetrakis(2,3,4,6-tetrafluorophenyl) borane, trialkylammonium tetrakis(perfluoronaphthyl)borane, an N,N-dialkylanilinium tetrakis(perfluoronaphthyl) borane, a trialkylammonium tetrakis(perfluorobiphenyl) borane, an N,N-dialkylanilinium tetrakis(perfluorobiphenyl) borane, a trialkylammonium tetrakis(3,5-bis (trifluoromethyl)perfluorophenyl)borane, an N,N-dialkylanilinium tetrakis(3,5-bis(trifluoromethyl) perfluorophenyl)borane, an N,N-dialkyl-(2,4,6-trimethylanilinium) tetrakis(3,5-bis(trifluoromethyl) perfluorophenyl)borane, and a di-(isopropyl)ammonium tetrakis(pentafluorophenyl)borane, with each alkyl independently being a methyl, an ethyl, a propyl, n-butyl, sec-butyl, or t-butyl.

In some preferred embodiments, the ionic stoichiometric activator $Z_d^+$ $(A^{d-})$ can comprise, consist essentially of, or be one or more of N,N-dimethylanilinium tetrakis(perfluorophenyl)borane, N,N-dimethylanilinium tetrakis(perfluoronaphthyl)borane, N,N-dimethylanilinium tetrakis(perfluorobiphenyl)borane, N,N-dimethylanilinium tetrakis(3,5-bis (trifluoromethyl)perfluorophenyl)borane, N,N-dimethylanilinium tetrakis(perfluorophenyl)aluminate, N,N-dimethylanilinium tetrakis(perfluoronaphthyl)aluminate, triphenylcarbenium tetrakis(perfluoronaphthyl)borane, triphenylcarbenium tetrakis(perfluorobiphenyl)borane, triphenylcarbenium tetrakis(3,5-bis(trifluoromethyl)perfluorophenyl)borane, triphenylcarbenium tetra(perfluorophenyl) borane, triphenylcarbenium tetrakis(perfluorophenyl) aluminate, triphenylcarbenium tetrakis(perfluoronaphthyl) aluminate, [Ph$_3$C$^+$][B(C$_6$F$_5$)$_4$], [Me$_3$NH$^+$][B(C$_6$F$_5$)$_4^-$], 1-(4-(tris(pentafluorophenyl)borane)-2,3,5,6-tetrafluorophenyl) pyrrolidinium, and 4-(tris(pentafluorophenyl)borane)-2,3,5, 6-tetrafluoropyridine.

In some preferred embodiments, the activator can comprise a triaryl carbonium (such as one or more of triphenylcarbenium tetraphenylborane, triphenylcarbenium tetrakis (pentafluorophenyl)borane, triphenylcarbenium tetrakis(2,3, 4,6-tetrafluorophenyl)borane, triphenylcarbenium tetrakis (perfluoronaphthyl)borane, triphenylcarbenium tetrakis (perfluorobiphenyl)borane, and triphenylcarbenium tetrakis (3,5-bis(trifluoromethyl)phenyl)borane).

Bulky activators are also useful herein as NCAs. "Bulky activator" as used herein refers to anionic activators represented by the formula:

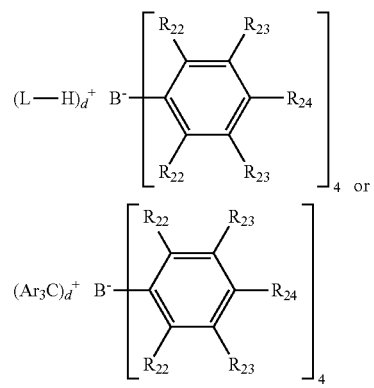

where: each $R^{22}$ is, independently, a halide, preferably a fluoride; Ar is substituted or unsubstituted aryl group (preferably a substituted or unsubstituted phenyl), e.g., substituted with $C_1$ to $C_{40}$ (such as $C_1$ to $C_{20}$) hydrocarbyls (such as alkyls or aromatics); each $R^{23}$ is, independently, a halide, a $C_6$ to $C_{20}$ substituted aromatic hydrocarbyl group, or a siloxy group of the formula —O—Si—$R_A$, where $R_A$ is a $C_1$ to $C_{20}$ hydrocarbyl or hydrocarbylsilyl group (e.g., a fluoride or a perfluorinated phenyl group); each $R^{24}$ is a halide, a $C_6$ to $C_{20}$ substituted aromatic hydrocarbyl group, or a siloxy group of the formula —O—Si—$R_A$, where $R_A$ is a $C_1$ to $C_{20}$ hydrocarbyl or hydrocarbylsilyl group (e.g., a fluoride or a $C_6$ perfluorinated aromatic hydrocarbyl group); wherein one $R^{23}$ and $R^{24}$ can form one or more saturated or unsaturated, substituted or unsubstituted rings (e.g., one $R^{23}$ and $R^{24}$ form a perfluorinated phenyl ring); and L is an neutral Lewis base; (L-H)+ is a Bronsted acid, with d being 1, 2, or 3 (typically 1). In particular embodiments, the anion can have a molecular weight of greater than 1020 g/mol, and/or at least three of the substituents on the B atom may each have a molecular volume of greater than 250 cubic Å, e.g., greater than 300 cubic Å or greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, Vol. 71, No. 11, November 1994, pp. 962-964. Molecular volume (MV), in units of cubic Å, is calculated using the formula: MV≈8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |

-continued

| Element | Relative Volume |
|---|---|
| $2^{nd}$ long period, Rb to I | 7.5 |
| $3^{rd}$ long period, Cs to Bi | 9 |

A list of particularly useful bulky activators is included, e.g., in U.S. Pat. No. 8,658,556, which is incorporated by reference herein. In some embodiments, one or more of the NCA activators can be chosen from the activators described in U.S. Pat. No. 6,211,105, which is incorporated by reference herein.

It is also within the scope of this invention that the catalyst compounds can be combined with combinations of alumoxanes and NCAs (see, for example, U.S. Pat. Nos. 5,153,157 and 5,453,410, European Patent No. EP 0 573 120, and PCT Publication Nos. WO 94/07928 and WO 95/14044, which discuss the use of an alumoxane in combination with an ionizing activator).

I.3. Scavenger

A scavenger can be an additional component of a catalyst system described herein. A scavenger is a compound typically added to facilitate oligomerization or polymerization by scavenging impurities. Some scavengers may also act as activators and may be referred to as co-activators. A co-activator which is not a scavenger may also be used in conjunction with an activator in order to form an active catalyst with a transition metal compound. In some embodiments, a co-activator can be pre-mixed with the transition metal compound to form an alkylated transition metal compound, also referred to as an alkylated catalyst compound or alkylated metallocene. To the extent scavengers facilitate the metallocene compound in performing the intended catalytic function, scavengers, if used, are sometimes considered as a part of the catalyst system.

U.S. Pat. No. 9,409,834 (e.g., at line 37, column 33 to line 61, column 34) provides detailed description of scavengers that can be useful in the process of the present invention for making oligomeric and/or polymeric products. The relevant portions in this patent on scavengers, their identities, quantity, and manner of use are incorporated herein in their entirety.

I.4. Chain Transfer Agent

Optionally, catalyst systems may include a chain transfer agent, e.g., to afford better control of molecular weight during the oligomerization or polymerization. In some embodiments, the activator or co-activator (or one of the activators or co-activators) can additionally function as a chain transfer agent. Useful chain transfer agents are typically alkylalumoxanes, a compound represented by the formula $AlR_3$, $ZnR_2$ (where each R is, independently, a $C_1$-$C_8$ aliphatic radical, such as a methyl, an ethyl, a propyl, a butyl, a pentyl, a hexyl, an octyl, or an isomer thereof), or a combination thereof, e.g., diethyl zinc, methylalumoxane, trimethylaluminum, triisobutylaluminum, trioctylaluminum, or a combination thereof.

I.5. Optional Support Material

In embodiments herein, the catalyst system, particularly but not limited to the activator and/or co-activator component, may comprise a support material, which can advantageously be relatively inert with respect to the polymerization/oligomerization reaction. In some preferred embodiments, the supported material can comprise or be a porous support material, e.g., talc, a zeolite, a clay, an organically modified clay, an inorganic oxide, or any other organic or inorganic support material, or a mixture thereof.

In some embodiments, the support material can comprise or be an inorganic oxide in a finely divided form. Suitable inorganic oxide materials for use in catalyst systems herein can include metal oxides of groups 2, 4, 13, and/or 14, such as silica, alumina, silicates, aluminates, aluminosilicates, and mixtures thereof. Other inorganic oxides that may be employed either alone or in combination with the silicon/aluminum oxides include those of magnesium, titanium, zirconium, calcium, vanadium, yttrium, niobium, cobalt, nickel, zinc, a lanthanide, or the like, or a combination thereof. Other suitable support materials can additionally or alternatively be employed, e.g., finely divided functionalized polyolefins, such as finely divided polyethylene. Particularly useful supports include magnesia, titania, zirconia, montmorillonite, phyllosilicate, zeolites, talc, clays, and the like, as well as combinations thereof. Also, combinations of these support materials may be used, for example, silica-chromia, silica-alumina, silica-titania, and the like. In preferred embodiments, support materials can include alumina, zirconia, silica, and combinations thereof, e.g., alumina and/or silica.

It is preferred that the (inorganic oxide) support material have a surface area in the range from about 10 $m^2$/g to about 700 $m^2$/g (e.g., from about 50 $m^2$/g to about 500 $m^2$/g or from about 100 $m^2$/g to about 400 $m^2$/g), a pore volume in the range from about 0.1 cc/g to about 4.0 cc/g (e.g., from about 0.5 cc/g to about 3.5 cc/g or from about 0.8 cc/g to about 3.0 cc/g), and an average particle size in the range from about 5 µm to about 500 µm (e.g., from about 10 µm to about 200 µm or from about 5 µm to about 100 µm). The average pore size of the support material useful in the invention can advantageously be in the range from about 10 Å to 1000 Å, e.g., from about 50 Å to about 500 Å or from about 75 Å to about 350 Å. In some embodiments, the support material can be a high surface area, amorphous silica (e.g., exhibiting a surface area of about 300 $m^2$/g and a pore volume of about 1.65 cc/g). In some embodiments, the support material can comprise or be a silica marketed under the tradename of DAVISON 952, DAVISON 948, or DAVISON 955 by the Davison Chemical Division of W.R. Grace and Company.

The support material should be dry, that is, substantially free of absorbed water. Drying of the support material can be effected, e.g., by heating or calcining at about 100° C. to about 1000° C., preferably at least about 600° C. When the support material is silica, it can be heated to at least 200° C., e.g., about 200° C. to about 850° C. or at about 600° C., for an appropriate time to drive off any adsorbed water (e.g., from about 1 minute to about 100 hours, from about 12 hours to about 72 hours, or from about 24 hours to about 60 hours). The calcined support material can typically have at least some reactive hydroxyl (OH) groups to produce supported catalyst systems. The calcined support material can then be contacted with at least one polymerization catalyst comprising at least one metallocene catalyst compound and an activator.

The support material, typically having reactive surface groups such as hydroxyl groups, can be slurried in a non-polar solvent and then contacted with a solution of a metallocene catalyst compound and an activator. In some embodiments, the slurry of the support material can first be contacted with the activator for a period of time from about 0.5 hours to about 24 hours, e.g., from about 2 hours to about 16 hours or from about 4 hours to about 8 hours, after which the solution of the catalyst compound can then be contacted with the isolated support/activator. In some embodiments, the supported catalyst system can be generated in situ. In alternative embodiments, the slurry of the support material may first be contacted with the metallocene catalyst compound for a period of time from about 0.5 hours to about 24 hours, e.g., from about 2 hours to about 16 hours or from about 4 hours to about 8 hours, after which slurry of the supported metallocene catalyst compound can then be contacted with the activator solution.

The mixture of the catalyst, activator, and support can be heated (or allowed to come) to a temperature of about 0° C. to about 70° C., e.g., about 15° C. to about 60° C. or at approximately room temperature. Contact times typically range from about 0.5 hours to about 24 hours, from about 2 hours to about 16 hours, or from about 4 hours to about 8 hours.

Suitable non-polar solvents can advantageously include materials in which all of the reactants used herein, i.e., at least the activator and the catalyst compound, are at least partially soluble and which are substantially liquid at reaction temperatures. In some embodiments, the non-polar solvent can comprise or be an alkane, such as isopentane, hexane, n-heptane, octane, nonane, and decane, although a variety of other materials including cycloalkanes, such as cyclohexane, aromatics, such as benzene, toluene, and ethylbenzene, may additionally or alternatively be employed.

II. PROCESS FOR MAKING A POLYMERIC OR AN OLIGOMERIC PRODUCT

In embodiments herein, an aspect of the invention relates to polymerization processes where monomer (such as ethylene), and optionally a comonomer, is/are contacted with a catalyst system comprising an activator and at least one catalyst compound, as described above. The catalyst compound and activator may be combined in any order, and are typically combined prior to contact with the monomer.

II.1. Monomer(s)

Monomers useful herein can include substituted or unsubstituted $C_2$ to $C_{40}$ alpha-olefins, preferably $C_2$ to $C_{20}$ alpha olefins, such as $C_2$ to $C_{12}$ alpha olefins, e.g., ethylene, propylene, butene, pentene, hexene, heptene, octene, nonene, decene, undecene, dodecene, isomers thereof, and mixtures thereof. In a preferred embodiment, the monomer comprises ethylene and an optional comonomer comprising one or more $C_4$ to $C_{40}$ olefins, such as one or more $C_4$ to $C_{20}$ olefins or one or more $C_6$ to $C_{12}$ olefins. The optional $C_4$ to $C_{40}$ olefin comonomers may be linear, branched, or cyclic. In some embodiments, the monomer comprises propylene and an optional comonomer comprising ethylene and/or one or more $C_4$ to $C_{40}$ olefins, such as ethylene and/or one or more $C_4$ to $C_{20}$ olefins or ethylene and/or one or more $C_6$ to $C_{12}$ olefins. If cyclic in any set of embodiments, the olefin (co)monomers may be strained or unstrained, monocyclic or polycyclic, and may optionally include heteroatoms and/or one or more functional groups.

Exemplary $C_2$ to $C_{40}$ olefin monomers and optional comonomers can include ethylene, propylene, butene, pentene, hexene, heptene, octene, nonene, decene, undecene, dodecene, norbornene, norbomadiene, dicyclopentadiene, cyclopentene, cycloheptene, cyclooctene, cyclooctadiene, cyclododecene, 7-oxanorbomene, 7-oxanorbornadiene, substituted derivatives thereof, isomers thereof, and combinations thereof, preferably including at least ethylene and one or more of hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbomadiene, and their respective homologs and derivatives.

In some embodiments, one or more dienes may be present as a comonomer (and thus its polymerized version in the polymer produced) at up to 10 wt %, e.g., from 100 wppb to 1.0 wt %, from 20 wppm to 5000 wppm, or from 30 wppm to 2000 wppm, based upon the total weight of the composition. In some embodiments, 500 wppm or less of diene is added to the polymerization feed, e.g., 400 wppm or less or 300 wppm or less; additionally or alternatively, at least 50 wppm of diene is added to the polymerization feed, e.g., 100 wppm or more or 150 wppm or more. If present, diolefin monomers useful in this invention can include any hydrocarbon structure, preferably $C_4$ to $C_{30}$, having at least two unsaturated bonds (typically, but not necessarily, conjugated), wherein at least two of the unsaturated bonds are readily polymerizable by either a stereospecific or a non-stereospecific catalyst(s). If present, it is preferred that diolefin monomers comprise or are alpha, omega-diene monomers (di-vinyl monomers), such as linear di-vinyl monomers, examples of which can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and combinations thereof. If present, particularly preferred dienes can include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, low molecular weight polybutadienes (Mw less than 1000 g/mol), cyclopentadiene, vinylnorbomene, norbomadiene, ethylidene norbornene, divinylbenzene, dicyclopentadiene and combinations thereof.

In some preferred embodiments, at least a portion (e.g., at least 80 mol %, at least 85 mol %, at least 90 mol %, at least 95 mol %, at least 96 mol %, at least 98 mol %, at least 99%, at least 99.5 mol %, or completely all, allowing for some impurities present in feed components) of the alpha-olefins present in the feed are linear alpha-olefins (LAOs), i.e., those without a branch attached to the carbon backbone thereof. Non-limiting examples of LAOs are ethylene, 1-propene, 1-butene, 1-pentene, 1-hexene, 1-heptene, 1-octene, 1-nonene, 1-decene, 1-dodecene, 1-tetradecene, 1-hexadecene, 1-octadecene, 1-icocene, $C_{22}$, $C_{24}$, $C_{26}$, $C_{28}$, and $C_{30}$ LAOs. Without being bound by theory, polymeric or oligomeric products made from such LAOs by using the process of the present disclosure can tend to have fewer branches and pendant groups, leading to generally more uniform product molecular structures, and hence typically better performance for certain applications, such as lubricant base stocks, lubricant additives, and the like. Desirably, at least one of the alpha-olefins in the mixture feed can be an LAO. In particular, substantially all of the alpha-olefins in the mixture feed can be LAOs.

In some preferred embodiments, the alpha-olefins present in the feed are comprised of at least a first content (e.g., more than 50 mol %, at least 55 mol %, at least 60 mol %, at least 65 mol %, at least 70 mol %, at least 75 mol %, at least 80 mol %, at least 85 mol %, at least 90 mol %, or at least 95 mol %) of ethylene ($C_2$ alpha-olefins), with a remainder content of $C_3$ to $C_{40}$ alpha-olefins present in the feed. In most such embodiments, the remainder content plus the first content sums to 100%. In additional or alternative embodiments, ethylene ($C_2$ alpha-olefins) may not be the only alpha-olefin present in the feed, such that the first content may be, e.g., 99.9 mol % or less, 99 mol % or less, 97 mol % or less, 95 mol % or less, 93 mol % or less, 90 mol % or less, 85 mol % or less, 80 mol % or less, 75 mol % or less, 70 mol % or less, 65 mol % or less, or 60 mol % or less, relative to a total content of alpha-olefins in the feed. In some embodiments where the remainder content of $C_3$ to $C_{40}$ alpha-olefins is non-zero, at least a portion (e.g., at least 40 mol %, more than 50 mol %, at least 55 mol %, at least 60 mol %, at least 65 mol %, at least 70 mol %, at least 75 mol %, at least 80 mol %, at least 85 mol %, at least 90 mol %, at least 95 mol %, at least 96 mol %, at least 98 mol %, at least 99%, at least 99.5 mol %, at least 99.9 mol %, or completely all, allowing for some impurities present in feed components) of the alpha-olefins present in the feed are $C_6$-$C_{18}$ or $C_6$-$C_{12}$ linear alpha-olefins, relative to a total content of $C_3$ to $C_{40}$ alpha-olefins in the feed. In particular embodiments, the first content can be from 60 mol % to 90 mol % and the remainder content can be from 10 mol % to 40 mol %.

The catalyst compositions can be used individually or can be mixed with other known polymerization catalysts to prepare polymer or oligomer blends. Monomer and catalyst selection can allow polymer or oligomer blend preparation under conditions analogous to those using individual catalysts. Polymers having increased PDI are available from polymers made with mixed catalyst systems and can thus be achieved. Mixed catalyst can comprise two or more metallocene compounds and or two or more activators.

The alpha-olefins used herein can optionally be produced directly from ethylene growth process as practiced by several commercial production processes, or they can be produced from Fischer-Tropsch hydrocarbon synthesis from $CO/H_2$ syngas, or from metathesis of internal olefins with ethylene, or from cracking of petroleum or Fischer-Tropsch synthetic wax at high temperature, or any other alpha-olefin synthesis routes. An exemplary feed for this invention can be at least 80 wt % alpha-olefin (preferably linear alpha olefin), preferably at least 90 wt % alpha-olefin (preferably linear alpha olefin), or approximately 100% alpha-olefin (preferably linear alpha olefin). However, alpha-olefin mixtures can also be used as feeds in this invention, especially if the other components are internal-olefins, branched olefins, paraffins, cyclic paraffins, aromatics (such as toluene and or xylenes). These components may have diluent effects and are believed to not have a substantial detrimental effect on the polymerization of alpha-olefins. In other words, the process described herein can selectively convert alpha-olefins in a mixture and leave the other components largely, if not completely, unreacted. This can be particularly useful when ethylene is not present in the mixture. This technology can be used to separate out alpha-olefins from a mixture by selectively reacting them with polymerization or oligomerization catalyst systems, effectively if not completely eliminating the need to separate alpha-olefins from the remainder of the components in a mixed feed stream. This can be economically advantageous, for example, in a process utilizing Fisher-Tropsch synthesis olefin product streams containing alpha-olefins, internal-olefins and branched olefins. Such a mixture can be fed to oligomerization technology as described herein and to selectively react away the alpha-olefin. No separate step to isolate the alpha-olefin may be needed. Another example of the utility of this process involves alpha-olefins produced by the metathesis of internal olefins with ethylene, which may contain some internal olefins. This mixed olefin base stock feed can be reacted as-is in the polymerization/oligomerization process of the present invention, which selectively converts the alpha-olefins into lube products. Thus, one can use the alpha-olefin for the base stock synthesis without having to separate the alpha-olefin from internal olefin. This can bring a significant improvement in process economics. The feed olefins can be the mixture of olefins produced from other linear alpha-olefin process containing $C_4$ to $C_{20}$ alpha-olefins as described in Chapter 3 "Routes to Alpha-Olefins" of the book Alpha Olefins Applications Handbook, Edited by G. R. Lappin and J. D. Sauer, published by Marcel Dekker, Inc. N.Y. 1989.

II.2. Feed Purification

Olefin feed and or solvents may be treated to remove catalyst poisons, such as peroxides, oxygen or nitrogen-containing organic compounds or acetylenic compounds before being supplied to the polymerization reactor. For example, the treatment of the linear alpha-olefin with an activated 13 Å molecular sieve and a de-oxygenate catalyst (i.e., a reduced copper catalyst) can increase catalyst productivity (expressed in terms of quantity of PAO produced per micromole of the metallocene compound used) more than 10-fold. Alternatively, the feed olefins and or solvents may be treated with an activated molecular sieve, such as 3 Å, 4 Å, 8 Å, or 13 Å molecular sieve, and/or in combination with an activated alumina or an activated de-oxygenate catalyst. Such treatment can desirably increase catalyst productivity 2- to 10-fold or more.

II.3. Polymerization Reaction

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. In some embodiments, a homogeneous polymerization process or a slurry polymerization process can be used. A homogeneous polymerization process is a process where at least 90 wt % of the product is soluble in the reaction medium. In particular embodiments, a bulk homogeneous process can be used. In a bulk process, monomer concentration in all feeds to the reactor is typically 70 vol % or more. In some embodiments, no solvent or diluent is present in or intentionally added to the reaction medium (e.g., except for the small amounts used as the carrier for the catalyst system or other additives, or amounts typically found with the monomer; e.g., ethane in ethylene). In a slurry polymerization process, a relatively insoluble (e.g., solid-supported) catalyst is employed and liquid (or gaseous) monomers are polymerized at the (liquid-solid and/or gas-solid) phase interface. In some slurry processes, at least 95 wt % of polymer products derived from the supported catalyst are in granular form as solid particles (i.e., not dissolved in the diluent).

Suitable diluents/solvents for polymerization can include non-coordinating (typically, relatively inert) liquids. Examples can include: straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (e.g., Isopar™); perhalogenated hydrocarbons, such as perfluorinated $C_{4-10}$ alkanes, chlorobenzene; aromatic and alkylsubstituted aromatic compounds, such as benzene, toluene, mesitylene, and xylene; and combinations thereof. Additional or alternative solvents can include liquid olefins that may act as monomers or comonomers, such as ethylene, propylene, 1-butene, 1-hexene, 1-pentene, 3-methyl-1-pentene, 4-methyl-1-pentene, 1-octene, 1-decene, 1-dodecene, and mixtures thereof. In a preferred embodiment, an aliphatic or cyclic hydrocarbon solvent is used as a solvent, such as isobutane, butane, pentane, isopentane, hexanes, isohexane, heptane, octane, nonane, decane, dodecane, cyclohexane, cycloheptane, methylcyclohexane, methylcycloheptane, or a mixture thereof. In some embodiments, the solvent is not aromatic, with aromatics being present in the solvent at less than 1 wt %, preferably less than 0.5 wt % or less than 0.1 wt %, based upon the total weight of all solvents.

In some embodiments, the feed concentration of the monomers and comonomers for the polymerization is 60 vol % solvent or less, e.g., 40 vol % or less or 20 vol % or less, based on the total volume of the feedstream. In a particular embodiment, the polymerization process is a bulk polymerization process.

When a solid supported catalyst is used for the conversion, a slurry polymerization/oligomerization process generally operates in the similar temperature, pressure and residence time range as described previously. In a slurry polymerization or oligomerization, a suspension of solid catalyst, promoters, monomer and comonomers are added. The suspension including diluent is intermittently or continuously removed from the reactor. The catalyst is then separated from the product by filtration, centrifuge or settlement. The fluid is then distilled to remove solvent, any unreacted components and light product. A portion or all of the solvent and unreacted component or light components can be recycled for reuse.

If the catalyst used is un-supported or is a solution catalyst, when the reaction is complete or when the product is withdrawn from the reactor (such as in a CSTR), the product may still contain soluble, suspended, or mixed catalyst system components. These components can preferably be deactivated and/or removed. Any of the usual catalyst deactivation methods or aqueous wash methods can be used to remove the catalyst system component. Typically, the reaction can be deactivated by addition of stoichiometric amount or excess of air, moisture, alcohol, isopropanol, etc. The mixture can then be washed with dilute sodium hydroxide or with water to remove catalyst system components. The residual organic layer may then be subjected to distillation to remove solvent, which can optionally be recycled for reuse. The distillation can further remove any light reaction product, e.g., from $C_{18}$ and less. These light components can be used as diluent for further reaction or can be used as olefinic raw material for other chemical synthesis, as these light olefin by-products may have vinylidene unsaturation, most suitable for further functionalization to convert in high performance fluids. Additionally, or alternatively, these light olefin products can be hydrogenated to be used as high quality paraffinic solvents.

Preferred polymerizations can be run at any temperature and/or pressure suitable to obtain the desired ethylene (co)polymers. Typical temperatures and/or pressures can include: a temperature in the range of from about 0° C. to about 300° C., e.g., from about 20° C. to about 200° C., from about 35° C. to about 150° C., from about 40° C. to about 120° C., or from about 45° C. to about 80° C.; and at a pressure in the range of from about 0.35 MPa to about 10 MPa, e.g., from about 0.45 MPa to about 6 MPa or from about 0.5 MPa to about 4 MPa. In a typical polymerization, the run time of the reaction can be up to 300 minutes, e.g., from about 5 minutes to about 250 minutes or from about 10 minutes to about 120 minutes.

In some embodiments, hydrogen is present in the polymerization reactor, e.g., at a partial pressure of about 0.001 psig to about 50 psig (~7 Pag to ~350 kPag), from about 0.01 psig to about 25 psig (~70 Pag to ~170 kPag), or from about 0.1 psig to about 10 psig (~0.7 kPag to ~70 kPag).

In certain embodiments, the activity of the catalyst can be at least 50 g/mmol/hour, e.g., 500 g/mmol/hour or more, 5 kg/mmol/hr or more, or 50 kg/mmol/hr or more. Additionally or alternatively, the conversion (yield) of olefin monomer (to polymeric or oligomeric product) can be at least 10%, based upon the weight of the monomer entering the reaction zone, e.g., 20% or more, 30% or more, 50% or more, or 80% or more.

In some embodiments, little or no scavenger is used in the process to produce the olefin (co)polymer. For example, a metal-containing scavenger (such as trialkylaluminum) can be present at about 0 mol %, or alternatively at a molar ratio of scavenger metal to transition metal (M) of less than 100:1, e.g., less than 50:1, less than 15:1, or less than 10:1.

In some preferred embodiments, at least one (e.g., at least two, at least three, at least four, at least five, at least six, or all seven) of the following characterizations is(are) true regarding the polymerization process: 1) the polymerization is conducted at temperatures of 0 to 300° C. (e.g., 25 to 150° C., 40 to 120° C., or 45 to 80° C.); 2) the polymerization is conducted at a pressure from atmospheric pressure (0 MPag) to 10 MPag (e.g., from 0.35 MPag to 10 MPag, from 0.45 MPag to 6 MPag, or from 0.5 MPag to 4 MPag); 3) the polymerization is conducted in an cyclic and/or aliphatic hydrocarbon solvent (such as isobutane, butane, pentane, isopentane, hexanes, isohexane, heptane, octane, nonane, decane, dodecane, cyclohexane, cycloheptane, methylcyclohexane, methylcycloheptane, or a mixture thereof, preferably with aromatics being present in the solvent at less than 1 wt %, e.g., less than 0.5 wt % or less than 0.1 wt %, based upon the weight of the solvents); 4) the polymerization occurs in one reaction zone; 5) the productivity of the catalyst compound is at least 5 kg/mmol/hr (e.g., at least 50 kg/mmol/hr, at least 80 kg/mmol/hr, at least 100 kg/mmol/hr, at least 200 kg/mmol/hr, or at least 250 kg/mmol/hr); 6) metal-containing scavengers (such as trialkyl aluminum compounds) are absent (e.g., present at about 0 mol %) or are present at a molar ratio of scavenger metal to transition metal of less than 100:1 (e.g., less than 50:1, less than 15:1, or less than 10:1); and 7) hydrogen is present in the polymerization reactor at a partial pressure about 0.001 psig to about 50 psig (~7 Pag to ~350 kPag) (e.g., from about 0.01 psig to about 25 psig (~70 Pag to ~170 kPag), or from about 0.1 psig to about 10 psig (~0.7 kPag to ~70 kPag)). In some embodiments, the catalyst system used in the polymerization comprises no more than one metallocene catalyst compound. A "reaction zone," also referred to as a "polymerization zone," is any vessel in which polymerization takes place, for example a batch reactor. When multiple reactors are used in either series or parallel configuration, each reactor is considered as a separate reaction/polymerization zone. For a multi-stage polymerization in both batch and continuous reactors, each polymerization stage is considered as a separate reaction/polymerization zone.

Other additives may optionally be used in the polymerization, as desired, such as one or more scavengers, promoters, modifiers, chain transfer agents, reducing agents, oxidizing agents, hydrogen, aluminum alkyls, silanes, or the like, or combinations thereof.

The polymerization reaction mixture can then be quenched, e.g., by the addition of a quenching agent such as water, $CO_2$, methanol, ethanol, mixtures thereof, and the like. Subsequently, the polymerization reaction mixture can be separated to remove the residual monomer, which can be recycled to the polymerization reactor. Monomer removal can be carried out by means such as flashing under vacuum, distillation, or extraction.

III. POLYMERIZATION PRODUCTS

The present invention further provides compositions of matter, which can be produced by the methods and/or processes described herein.

In a preferred embodiment, the process described herein produces ethylene homopolymers or ethylene copolymers, such as ethylene-alpha-olefin (preferably $C_3$ to $C_{20}$) copolymers (such as ethylene-butene copolymers, ethylene-hexene and/or ethylene-octene copolymers) having an Mw/Mn of greater than 1 to 40 (preferably greater than 1 to 4, preferably greater than 1 to 3).

Likewise, processes of the present invention can form ethylene copolymers. In a preferred embodiment, the copolymers produced herein can have from 0 mol % to 35 mol % (e.g., from 0.1 mol % to 30 mol %, from 0.3 mol % to 35 mol %, from 0.5 mol % to 20 mol %, from 1 mol % to 15 mol %, or from 3 mol % to 10 mol %) of one or more $C_3$ to $C_{40}$ olefin comonomers, such as a $C_3$-$C_{40}$ alpha-olefin, a $C_3$-$C_{30}$ alpha-olefin, a $C_3$-$C_{20}$ alpha-olefin, a $C_6$-$C_{18}$ alpha-olefin, a $C_3$-$C_{12}$ alpha-olefin, or a $C_6$-$C_{12}$ alpha-olefin (preferably including one or more of propylene, butene, hexene, octene, decene, and dodecene).

In a particular embodiment, the monomer is ethylene and the comonomer is hexene, preferably from 1 mol % to 15 mol % hexene or from 1 mol % to 10 mol %. In a particular embodiment, the monomer is ethylene and the comonomer is octene, preferably from 1 mol % to 15 mol % octene or from 1 mol % to 10 mol % octene. In a particular embodiment, the monomer is ethylene and the comonomer is decene, preferably from 1 mol % to 15 mol % decene or from 1 mol % to 10 mol % decene.

In advantageous embodiments, a polymer product according to the invention may be made from an alpha-olefin feed comprising ethylene ($C_2$) monomer and a $C_3$ to $C_{40}$ alpha-olefin comonomer. In such advantageous embodiments, in some cases as a result of the polymerization processes described herein and/or of the metallocene catalysts/catalyst systems described herein, the polymer product can exhibit one or more (e.g., two or more, three or more, four or more, or all five) of the following: an Mn from 5000 g/mol to 70000 g/mol (e.g., from 5000 g/mol to 50000 g/mol, from 5000 g/mol to 40000 g/mol, from 5000 g/mol to 30000 g/mol, from 5000 g/mol to 25000 g/mol, from 7000 g/mol to 70000 g/mol, from 7000 g/mol to 50000 g/mol, from 7000 g/mol to 40000 g/mol, from 7000 g/mol to 30000 g/mol, from 7000 g/mol to 25000 g/mol, from 9000 g/mol to 70000 g/mol, from 9000 g/mol to 50000 g/mol, from 9000 g/mol to 40000 g/mol, from 9000 g/mol to 30000 g/mol, from 9000 g/mol to 25000 g/mol, from 11000 g/mol to 70000 g/mol, from 11000 g/mol to 50000 g/mol, from 11000 g/mol to 40000 g/mol, from 11000 g/mol to 30000 g/mol, from 11000 g/mol to 25000 g/mol, from 13000 g/mol to 70000 g/mol, from 13000 g/mol to 50000 g/mol, from 13000 g/mol to 40000 g/mol, from 13000 g/mol to 30000 g/mol, or from 13000 g/mol to 25000 g/mol), as measured by GPC; a PDI from 4.1 to 15 (e.g., from 4.1 to 13, from 4.1 to 11, from 4.1 to 10, from 4.1 to 9.0, from 4.1 to 8.0, from 4.1 to 7.5, from 4.2 to 15, from 4.2 to 13, from 4.2 to 11, from 4.2 to 10, from 4.2 to 9.0, from 4.2 to 8.0, or from 4.2 to 7.5), as measured by GPC; an average content of polymerized $C_3$ to $C_{40}$ alpha-olefin comonomer, relative to a total content of alpha-olefin monomers and comonomers polymerized in the polymer product, as measured by GPC, that increases for each quartile (alternatively for each hexile, octile, or decile) of increasing MWD of the polymer product; optionally a span of content of copolymerized $C_3$ to $C_{40}$ alpha-olefins across the MWD of the polymer product that is no greater than 50% (e.g., no greater than 45%, no greater than 40%, no greater than 35%, no greater than 30%, or no greater than 25%) above or below a mean content of copolymerized $C_3$ to $C_{40}$ alpha-olefins across the MWD of the polymer product; and optionally a melt index ratio (MIR) from 20 to 190 (e.g., from 20 to 170, from 20 to 150, from 20 to 130, from 20 to 120, from 20 to 110, from 30 to 100, from 30 to 90, from 20 to 80, from 20 to 70, from 20 to 60, from 30 to 190, from 30 to 170, from 30 to 150, from 30 to 130, from 30 to 120, from 30 to 110, from 30 to 100, from 30 to 90, from 30 to 80, from 30 to 70, from 30 to 60, from 40 to 190, from 40 to 170, from 40 to 150, from 40 to 130, from 40 to 120, from 40 to 110, from 40 to 100, from 40 to 90, from 40 to 80, from 40 to 70, from 40 to 60, from 50 to 190, from 50 to 170, from 50 to 150, from 50 to 130, from 50 to 120, from 50 to 110, from 50 to 100, from 50 to 90, from 60 to 190, from 60 to 170, from 60 to 150, from 60 to 130, from 60 to 120, from 60 to 110, from 60 to 100, from 60 to 90, from 75 to 190, from 75 to 170, from 75 to 150, from 75 to 130, from 75 to 120, from 75 to 110, or from 75 to 100). In some embodiments, a span of content of copolymerized $C_3$ to $C_{40}$ alpha-olefins across the MWD of the polymer product may be at least 25% (e.g., at least 30%, at least 35%, at least 40%, at least 45%, at least 50%, or at least 65%; additionally or alternatively, up to 100%, up to 90%, up to 80%, up to 75%, up to 70%, up to 65%, up to 60%, up to 55%, or up to 50%) above or below a mean content of copolymerized $C_3$ to $C_{40}$ alpha-olefins across the MWD of the polymer product.

In some embodiments, the polymer product can have a unimodal or multimodal molecular weight distribution as determined by Gel Permeation Chromatography (GPC). By "unimodal" is meant that the GPC trace has one peak or two inflection points. By "multimodal" is meant that the GPC trace has at least two peaks or more than 2 inflection points. An inflection point is that point where the second derivative of the curve changes in sign (e.g., from negative to positive or vice versa). In some embodiments, the polymer product can have a bimodal molecular weight distribution, as determined by Gel Permeation Chromatography (GPC), in which the GPC trace has two peaks or at least 4 inflection points.

In some embodiments, the polymer product can have two peaks in the TREF measurement (see below). Two peaks in the TREF measurement, as used herein, means the presence of two distinct normalized IR response peaks in a graph of normalized IR response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. If present, the two distinct peaks may be at least 3° C. apart, e.g., at least 4° C. apart or at least 5° C. apart. In some embodiments, both of the distinct peaks may occur at a temperature on the graph above 20° C. and below 120° C., where the elution temperature is run to 0° C. or lower. This limitation can avoid confusion with an apparent peak on the graph at low temperature that can be caused by material remaining relatively soluble at the lowest elution temperature. Two peaks on such a graph can indicate a bi-modal composition distribution (CD). An alternate method for TREF measurement can be used if the TREF method below does not show two peaks, e.g., see B. Monrabal, "Crystallization Analysis Fractionation: A New Technique for the Analysis of Branching Distribution in Polyolefins," Journal of Applied Polymer Science, Vol. 52, 491-499 (1994).

III.1. TREF Method

Temperature Rising Elution Fractionation (TREF) analysis can be done using a Crystallization Elution Fractionation (CEF) instrument from Polymer Char, S.A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.*, 2007, 257, 71. In particular, a process conforming to the "TREF separation process" shown in FIG. 1a of this article, in which Fc=0, can be used. Pertinent details of the analysis method and features of the apparatus used can be as follows.

The solvent useful for preparing the sample solution and for elution can be 1,2-Dichlorobenzene (ODCB) which can be stabilized by dissolving 1.6 g of 2,6-bis(1,1-dimethylethyl)-4-methylphenol (butylated hydroxytoluene) in a ~4 L bottle of fresh solvent at ambient (room) temperature. The stabilized solvent can then be filtered using a ~0.1-µm Teflon filter (Millipore). The sample (~6-10 mg) to be analyzed can typically be dissolved in ~8 ml of ODCB metered at ambient (room) temperature by stirring (e.g., at Medium setting) at ~150° C. for ~90 mins. A small volume of the polymer solution can first be filtered by an inline filter (e.g., stainless steel, ~10 µm), which can be back-flushed after every filtration. The filtrate can then be used to substantially/completely fill a ~200 µL injection-valve loop. The volume in the loop can then be introduced near the center of the CEF column (~15 cm long SS tubing, ~⅜" o.d., ~7.8 mm i.d.) packed with an inert support (SS balls) at ~140° C., and the column temperature can be stabilized at ~125° C. for ~20 mins. The sample volume may then be allowed to crystallize in the column by reducing the temperature to ~0° C. at a cooling rate of ~1° C./min. The column may be kept at ~0° C. for ~10 mins before injecting the ODCB flow (~1 mL/min) into the column for ~10 min to elute and measure the polymer that did not crystallize (soluble fraction). The wide-band channel of the infrared detector used (Polymer Char IR5) can generate an absorbance signal proportional to the concentration of polymer in the eluting flow. A complete TREF curve can then be generated by increasing the temperature of the column from ~0° C. to ~140° C. at a rate of ~2° C./min while maintaining the ODCB flow at ~1 mL/min to elute and measure the concentration of the dissolving polymer.

III.2. GPC 4D Procedure: Molecular Weight, Comonomer Composition and Long Chain Branching Determination by GPC-IR Hyphenated with Multiple Detectors Unless otherwise indicated, the distributions and the moments of molecular weight (Mw, Mn, Mw/Mn, etc.), the comonomer content ($C_2$, $C_3$, $C_6$, etc.), and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel ~10-µm Mixed-B LS columns can be used to provide polymer separation. Aldrich reagent grade 1,2,4-trichlorobenzene (TCB) with ~300 ppm antioxidant butylated hydroxytoluene (BHT) can be used as the mobile phase. The TCB mixture can be filtered through a ~0.1-µm Teflon filter and degassed with an online degasser before entering the GPC instrument. The nominal flow rate can be ~1.0 mL/min, with a nominal injection volume of ~200 µL. The whole system including transfer lines, columns, and detectors can be contained in an oven maintained at ~145° C. The polymer sample can be weighed and sealed in a standard vial with ~80-µL flow marker (e.g., heptane) added to it. After loading the vial in the autosampler, polymer may be automatically dissolved in the instrument with ~8 ml added TCB solvent. The polymer can be dissolved at ~160° C. with continuous shaking for about 1 hour for most PE samples or ~2 hours for PP samples. The TCB densities used in concentration calculation are ~1.463 g/ml at room temperature and ~1.284 g/ml at ~145° C. The sample solution concentration can be from ~0.2 mg/mL to 2.0 mg/mL, with lower concentrations being used for higher molecular weight samples. The concentration (c), at each point in the chromatogram can be calculated from the baseline-subtracted IR5 broadband signal intensity (I), using the following equation: c=βI, where β is the mass constant. The mass recovery can be calculated from the ratio of the integrated area of the concentration chromatography over elution volume and the injection mass, which is equal to the pre-determined concentration multiplied by injection loop volume. The conventional molecular weight (IR MW) can be determined by combining universal calibration relationship with the column calibration, as performed with a series of monodispersed polystyrene (PS) standards ranging from ~700 g/mol to ~10M g/mol. The molecular weight at each elution volume is calculated with following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript are for the test samples. In this method, $a_{PS} \approx 0.67$ and $K_{PS} \approx 0.000175$, while $\alpha$ and K for other materials can be as calculated and published in literature (Sun, T. et al. *Macromolecules*, 2001, 34, 6812), except that, for purposes of the present invention, $\alpha \approx 0.695$ and $K \approx 0.000579$ for linear ethylene polymers, $\alpha \approx 0.705$ and $K \approx 0.0002288$ for linear propylene polymers, $\alpha \approx 0.695$ and $K \approx 0.000181$ for linear butene polymers, $\alpha \approx 0.695$ and $K \approx 0.000579*(1-0.0087*w2b+0.000018*(w2b)^2)$ for ethylene-butene copolymers where w2b is a bulk weight percent of butene comonomer, $\alpha \approx 0.695$ and $K \approx 0.000579*(1-0.0075*w2b)$ for ethylene-hexene copolymers where w2b is a bulk weight percent of hexene comonomer, and $\alpha \approx 0.695$ and $K \approx 0.000579*(1-0.0077*w2b)$ for ethylene-octene copolymers where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition can be determined by the ratio of the IR5 detector intensity corresponding to $CH_2$ and $CH_3$ channel calibrated with a series of PE and PP homo/copolymer standards whose nominal value are predetermined by NMR or FTIR. In particular, this can provide the methyls per 1000 total carbons ($CH_3/1000TC$) as a function of molecular weight. The short-chain branch (SCB) content per 1000TC (SCB/1000TC) can then be computed as a function of molecular weight by applying a chain-end correction to the $CH_3/1000TC$ function, assuming each chain to be linear and terminated by a methyl group at each end. The weight % comonomer can then be obtained from the following expression in which $f$ is 0.3, 0.4, 0.6, 0.8, and so on for $C_3$, $C_4$, $C_6$, $C_8$, and so on co-monomers, respectively:

$$w2 = f*SCB/1000TC.$$

The bulk composition of the polymer from the GPC-IR and GPC-4D analyses can be obtained by considering the entire signals of the $CH_3$ and $CH_2$ channels between the integration limits of the concentration chromatogram. First, the following ratio can be obtained:

$$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, can be applied to obtain the bulk $CH_3$/1000TC. A bulk methyl chain ends per 1000TC (bulk $CH_3$ end/1000TC) can be obtained by weight-averaging the chain-end correction over the molecular-weight range. Then, $w2b = f * \text{bulk CH3/1000TC};$ bulk SCB/1000TC=bulk CH3/1000TC−bulk $CH_3$end/1000TC and bulk SCB/1000TC can be converted to bulk w2 in the same manner as described above.

The 18-angle Wyatt Technology High Temperature DAWN HELEOSII can be used as the LS detector. The LS molecular weight (M) at each point in the chromatogram can be determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n≈1.500 for TCB at ~145° C. and λ≈665 nm. For analyzing polyethylene homopolymers, ethylene-hexene copolymers, and ethylene-octene copolymers, dn/dc≈0.1048 ml/mg and $A_2$≈0.0015; for analyzing ethylene-butene copolymers, dn/dc≈0.1048*(1−0.00126*w2) ml/mg, and $A_2$≈0.0015 where w2 is weight percent butene comonomer.

A high temperature Agilent (or Viscotek Corporation) viscometer, which has four capillaries arranged in a Wheatstone bridge configuration with two pressure transducers, can be used to determine specific viscosity. One transducer can measure the total pressure drop across the detector, and the other, positioned between the two sides of the bridge, can measure a differential pressure. The specific viscosity, $\eta_S$, for the solution flowing through the viscometer can be calculated from their outputs. The intrinsic viscosity, [$\eta$], at each point in the chromatogram can be calculated from the equation [$\eta$]=$\eta_S$/c, where c is concentration and can be determined from the IR5 broadband channel output. The viscosity molecular weight at each point can be calculated as $M = K_{pS} M^{\alpha_{pS}+1}/[\eta]$, where $\alpha_{pS} \approx 0.67$ and $K_{pS} \approx 0.000175$.

The branching index ($g'_{vis}$) can be calculated using the output of the GPC-IR5-LS-VIS method as follows. The average intrinsic viscosity, $[\eta]_{avg}$, of the sample can be calculated by:

$$[\eta]_{avg} = \frac{\Sigma c_i [\eta]_i}{\Sigma c_i}$$

with summations over the chromatographic slices, i, between the integration limits. The branching index $g'_{vis}$ is defined as $$g'_{vis} = \frac{[\eta]_{avg}}{K M_v^\alpha},$$

where $M_v$ is the viscosity-average molecular weight, which can be based on molecular weights determined by LS analysis and the K and α for the reference linear polymer, which can be, for purposes of the present invention, α≈0.695 and K≈0.000579 for linear ethylene polymers, α≈0.705 and K≈0.0002288 for linear propylene polymers, α≈0.695 and K≈0.000181 for linear butene polymers, α≈0.695 and K≈0.000579*(1−0.0087*w2b+0.000018*(w2b)²) for ethylene-butene copolymer where w2b is a bulk weight percent of butene comonomer, α≈0.695 and K≈0.000579*(1−0.0075*w2b) for ethylene-hexene copolymer where w2b is a bulk weight percent of hexene comonomer, and α≈0.695 and K≈0.000579*(1−0.0077*w2b) for ethylene-octene copolymer where w2b is a bulk weight percent of octene comonomer. Concentrations are typically expressed in g/cm³, molecular weight in g/mol, and intrinsic viscosity (hence K in the Mark-Houwink equation) in dL/g, unless otherwise noted. Calculation of the w2b values can be as discussed above.

The reversed-co-monomer index (RCI,m) can be computed from x2 (mol % co-monomer $C_3$, $C_4$, $C_6$, $C_8$, etc.), as a function of molecular weight, where x2 can be obtained from the following expression in which n is the number of carbon atoms in the comonomer (3 for $C_3$, 4 for $C_4$, 6 for $C_6$, etc.):

$$x2 = -\frac{200 w2}{-100 n - 2 w2 + n w2}.$$

Then the molecular-weight distribution, W(z) where $z = \log_{10} M$, can be modified to W'(z) by setting to 0 the points in W that are less than 5% of the maximum of W; this is to effectively remove points for which the S/N in the composition signal is low. Also, points of W' for molecular weights below 2000 g/mol can be set to 0. Then W' can be renormalized so that $$1 = \int_{-\infty}^{\infty} W' dz$$

and a modified weight-average molecular weight ($M_w'$) can be calculated over the effectively reduced range of molecular weights as follows:

$$M'_w = \int_{-\infty}^{\infty} 10^Z * W' dz.$$

The RCI,m can then be computed as $$RCI, m = \int_{-\infty}^{\infty} x2(10^z - M'_w)W' dz.$$

A reversed-co-monomer index (RCI,w) can additionally or alternatively be defined on the basis of the weight fraction co-monomer signal (w2/100), which can be computed as follows:

$$RCI, w = \int_{-\infty}^{\infty} \frac{w2}{100}(10^z - M'_w)W' dz.$$

Note that, in the above definite integrals, the limits of integration are the widest possible for the sake of generality; however, in reality the function may be integrated only over a finite range for which data is acquired, considering the function in the rest of the non-acquired range to be effectively 0. Also, by the manner in which W' is obtained, it is possible that W' can be a discontinuous function, and the above integrations may need to be done piecewise.

Three co-monomer distribution ratios can additionally or alternatively be defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)}$$

where w2(Mw) is the % weight co-monomer signal corresponding to a molecular weight of Mw, w2(Mz) is the % weight co-monomer signal corresponding to a molecular weight of Mz, w2[w2(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be defined utilizing the % mole co-monomer signal, CDR-1,m, CDR-2,m, CDR-3,m, as:

$$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

IV. ADDITIONAL EMBODIMENTS

Additionally or alternatively, the present invention can include one or more of the following embodiments.

Embodiment 1

A metallocene catalyst compound comprising a structure represented by formula (F-MC) below comprising a first cyclopentadienyl ring with carbon atoms directly connected with $R^1$, $R^2$, $R^4$, and $R^5$, and a second cyclopentadienyl ring with carbon atoms directly connected with $R^{10}$, $R^{11}$, $R^{12}$, and $R^{13}$, and a bridging group (BG) directly connecting the first and second cyclopentadienyl rings

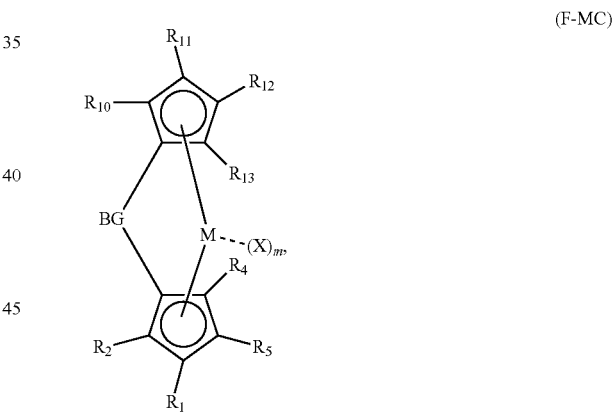

(F-MC)

wherein:
each of $R^4$ and $R^5$ is a hydrogen, a substituted or unsubstituted linear, branched linear, or cyclic $C_1$-$C_{30}$ hydrocarbyl group, or a substituted or unsubstituted linear, branched linear, or cyclic $C_1$-$C_{30}$ hydrosilylcarbyl group;
$R^1$ and $R^2$ are each independently a hydrogen or a substituted or unsubstituted linear, branched linear, or cyclic $C_1$-$C_{30}$ hydrocarbyl group, or $R^1$ and $R^2$, taken together with the carbon atoms in the first cyclopentadienyl ring to which they are directly connected, collectively form one or more substituted or unsubstituted rings annelated to the first cyclopentadienyl ring;
each of $R^{10}$ and $R^{11}$ is a hydrogen or a substituted or unsubstituted linear, branched linear, or cyclic $C_1$-$C_{30}$ hydrocarbyl group;
$R^{12}$ and $R^{13}$ are each independently a hydrogen or a substituted or unsubstituted linear, branched linear, or cyclic $C_1$-$C_{30}$ hydrocarbyl group, or $R^{12}$ and $R^{13}$, taken together with the carbon atoms in the second cyclopentadienyl ring to which they are directly connected, collectively form one or more substituted or unsubstituted rings annelated to the second cyclopentadienyl ring;

M is a transition metal having an integer valency of v;

each X is independently a halogen, a hydride, an amide, an alkoxide, a substituted alkoxide, a sulfide, a phosphide, a diene, an amine, a phosphine, an ether, or a $C_1$-$C_{20}$ substituted or unsubstituted linear, branched, or cyclic hydrocarbyl group, or optionally two or more X moieties may together form a fused ring or ring system;

m is an integer equal to v-2; and the bridging group (BG) comprises —[$BA(R^{20})_2$]$_n$—, wherein: n is an integer from 1 to 3; each BA, the same or different at each occurrence, is independently carbon, silicon, or germanium; and each $R^{20}$, the same or different at each occurrence, is each independently a $C_1$-$C_8$ substituted or unsubstituted linear, branched, or cyclic hydrocarbyl group or a pendant group having a formula —$R^{21}$-G13($X_2$), where each G13 is a group 13 element, each $R^{21}$ is independently a $C_1$-$C_8$ substituted or unsubstituted linear, branched, or cyclic hydrocarbyl group, and each X is defined as above; provided that at least one $R^{20}$ is a pendant group of the formula —$R^{21}$-G13($X_2$).

Embodiment 2

The metallocene compound of embodiment 1, wherein M comprises Zr or Hf and m is 2.

Embodiment 3

The metallocene compound of embodiment 1 or embodiment 2, wherein each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide.

Embodiment 4

The metallocene compound of any one of the preceding embodiments, wherein the metallocene compound has a structure represented by formula (F-MC1) below:

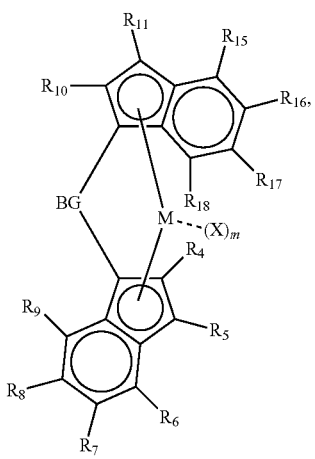

(F-MC1)

such that:

$R^1$ and $R^2$, taken together with the carbon atoms in the first cyclopentadienyl ring to which they are directly connected, collectively form a substituted or unsubstituted phenyl ring annelated to the first cyclopentadienyl ring; and $R^{12}$ and $R^{13}$, taken together with the carbon atoms in the second cyclopentadienyl ring to which they are directly connected, collectively form a substituted or unsubstituted phenyl ring annelated to the second cyclopentadienyl ring, wherein $R^6$, $R^7$, $R^8$, $R^9$, $R^{15}$, $R^{16}$, $R^{17}$, and $R^{18}$ are each independently a hydrogen or a substituted or unsubstituted linear, branched linear, or cyclic $C_1$-$C_6$ hydrocarbyl group.

Embodiment 5

The metallocene compound of embodiment 4, wherein at least eight of $R^4$, $R^5$, $R^6$, $R^7$, $R^8$, $R^9$, $R^{10}$, $R^{11}$, $R^{15}$, $R^{16}$, $R^{17}$, and $R^{18}$ are a hydrogen.

Embodiment 6

The metallocene compound of claim 5, wherein:

each of $R^4$ and $R^5$ is a hydrogen or a substituted or unsubstituted linear, branched linear, or cyclic $C_1$-$C_8$ hydrocarbyl group;

each of $R^{10}$ and $R^{11}$ is a hydrogen or a substituted or unsubstituted linear, branched linear, or cyclic $C_1$-$C_8$ hydrocarbyl group;

at least ten of $R^4$, $R^5$, $R^6$, $R^7$, $R^8$, $R^9$, $R^{10}$, $R^{11}$, $R^{15}$, $R^{16}$, $R^{17}$, and $R^{s1}$ are a hydrogen;

M is Hf or Zr, and m is 2;

each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide; and the bridging group (BG) is —[$BA(R^{20})_2$]—, wherein: the bridging atom, BA, is carbon or silicon; one $R^{20}$ is a $C_1$-$C_8$ substituted or unsubstituted linear, branched, or cyclic hydrocarbyl group; and the other $R^{20}$ is a pendant group having a formula —$R^{21}$-G13($X_2$), where G13 is boron or aluminum, $R^{21}$ is a $C_1$-$C_8$ substituted or unsubstituted linear, branched, or cyclic hydrocarbyl group, and each X is defined as above.

Embodiment 7

The metallocene compound of any of the preceding embodiments, and having the following structure:

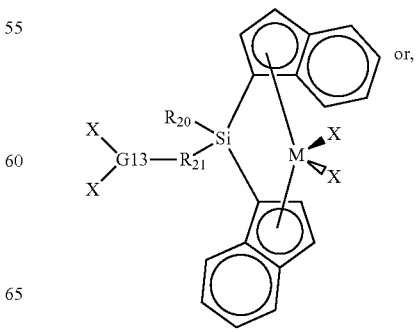

-continued

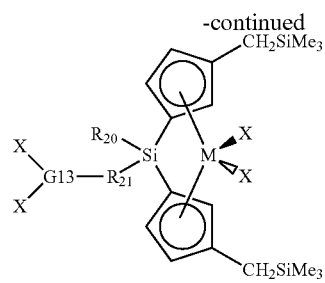

wherein: M is Hf or Zr;

each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide;

$R^{20}$ and $R^{21}$ are each independently a $C_1$-$C_8$ substituted or unsubstituted linear, branched, or cyclic hydrocarbyl group; and G13 is boron or aluminum.

Embodiment 8

A catalyst system comprising a metallocene catalyst compound of any of the preceding embodiments, activator, optional scavenger, and optional support.

Embodiment 8.5

A catalyst system comprising a metallocene catalyst compound of any of the preceding embodiments, a non-coordinating anion type activator comprising a supported alumoxane or aluminum alkyl, and optionally a scavenger.

Embodiment 9

The catalyst system of embodiment 8, wherein the activator is supported alumoxane, such as supported methyl alumoxane.

Embodiment 9.5

The catalyst of embodiment 8, wherein the activator is selected from the group consisting of N,N-dimethylanilinium tetrakis(perfluorophenyl)borane, N,N-dimethylanilinium tetrakis(perfluoronaphthyl)borane, N,N-dimethylanilinium tetrakis(perfluorobiphenyl)borane, N,N-dimethylanilinium tetrakis(3,5-bis(trifluoromethyl)perfluorophenyl)borane, N,N-dimethylanilinium tetrakis(perfluorophenyl)aluminate, N,N-dimethylanilinium tetrakis(perfluoronaphthyl)aluminate, triphenylcarbenium tetrakis(perfluoronaphthyl)borane, triphenylcarbenium tetrakis(perfluorobiphenyl)borane, triphenylcarbenium tetrakis(3,5-bis(trifluoromethyl)perfluorophenyl)borane, triphenylcarbenium tetra(perfluorophenyl)borane, triphenylcarbenium tetrakis(perfluorophenyl)aluminate, triphenylcarbenium tetrakis(perfluoronaphthyl)aluminate, $[Ph_3C^+][B(C_6F_5)_4^-]$, $[Me_3NH^+][B(C_6F_5)_4^-]$, 1-(4-(tris(pentafluorophenyl)borane)-2,3,5,6-tetrafluorophenyl)pyrrolidinium, 4-(tris(pentafluorophenyl)borane)-2,3,5,6-tetrafluoropyridine, and combinations thereof.

Embodiment 10

The catalyst of embodiment 8, 8.5, 9, or 9.5 further comprising a second activator selected from the group consisting of N,N-dimethylanilinium tetrakis(perfluorophenyl)borane, N,N-dimethylanilinium tetrakis(perfluoronaphthyl)borane, N,N-dimethylanilinium tetrakis(perfluorobiphenyl)borane, N,N-dimethylanilinium tetrakis(3,5-bis(trifluoromethyl)perfluorophenyl)borane, N,N-dimethylanilinium tetrakis(perfluorophenyl)aluminate, N,N-dimethylanilinium tetrakis(perfluoronaphthyl)aluminate, triphenylcarbenium tetrakis(perfluoronaphthyl)borane, triphenylcarbenium tetrakis(perfluorobiphenyl)borane, triphenylcarbenium tetrakis(3,5-bis(trifluoromethyl)perfluorophenyl)borane, triphenylcarbenium tetra(perfluorophenyl)borane, triphenylcarbenium tetrakis(perfluorophenyl)aluminate, triphenylcarbenium tetrakis(perfluoronaphthyl)aluminate, $[Ph_3C^+][B(C_6F_5)_4^-]$, $[Me_3NH^+][B(C_6F_5)_4^-]$, 1-(4-(tris(pentafluorophenyl)borane)-2,3,5,6-tetrafluorophenyl)pyrrolidinium, 4-(tris(pentafluorophenyl)borane)-2,3,5,6-tetrafluoropyridine, and combinations thereof.

Embodiment 10.5

A catalyst system comprising a metallocene catalyst compound of any of embodiments 1 to 7, activator, and support.

Embodiment 10.6

The catalyst system of claim 10.5 wherein the activator is combined with the support prior to contact with the catalyst compound.

Embodiment 11

A process for making a polymeric product, the process comprising:
contacting a feed containing a $C_2$ to $C_{40}$ alpha-olefin with a catalyst system any one of Embodiments 8 to 10.6 in a polymerization reactor under polymerization conditions to effect a polymerization reaction to obtain a polymerization reaction mixture; and
obtaining a polymeric product from the polymerization reaction mixture.

Embodiment 12

The process of embodiment 11, wherein the feed comprises a first content of ethylene ($C_2$) being greater than 50 mol % and a remainder content of $C_3$ to $C_{40}$ alpha-olefins, relative to a total content of alpha-olefins in the feed.

Embodiment 13

The process of embodiment 12, wherein the remainder $C_3$ to $C_{40}$ content constitutes at least 75 mol % $C_6$-$C_{12}$ linear alpha-olefins, relative to a total content of $C_3$ to $C_{40}$ alpha-olefins in the feed.

Embodiment 14

The process of embodiment 12 or embodiment 13, wherein the first content is from 60 mol % to 90 mol % and the remainder content is from 10 mol % to 40 mol %.

Embodiment 15

The process of any one of embodiments 11 to 14, wherein the polymerization reaction results in the polymer product exhibiting, as measured by GPC: a number average molecular weight (Mn) from 7000 g/mol to 70000 g/mol; a polydispersity index (PDI) from 4.1 to 9.0; and optionally an average content of copolymerized $C_3$ to $C_{40}$ alpha-olefins, relative to a total content of alpha-olefins copolymerized in the polymer product, that increases for each quartile of increasing molecular weight distribution (MWD) of the polymer product.

Embodiment 16

The process of embodiment 15, wherein the polymerization reaction results in the polymer product further exhibiting, as measured by GPC, a span of content of copolymerized $C_3$ to $C_{40}$ alpha-olefins across a molecular weight distribution (MWD) of the polymer product that is no greater than 35% above or below a mean content of copolymerized $C_3$ to $C_{40}$ alpha olefins across the MWD of the polymer product.

Embodiment 17

A polymer product made from an alpha-olefin feed comprising ethylene ($C_2$) monomer and a $C_3$ to $C_{40}$ alpha-olefin comonomer, wherein the polymer product exhibits, as measured by GPC: an Mn from 7000 g/mol to 70000 g/mol; a PDI from 4.1 to 9.0; an average content of polymerized $C_3$ to $C_{40}$ alpha-olefin comonomer, relative to a total content of alpha-olefin monomers and comonomers polymerized in the polymer product, that increases for each quartile of increasing MWD of the polymer product; and optionally a span of content of copolymerized $C_3$ to $C_{40}$ alpha-olefins across the MWD of the polymer product that is no greater than 35% above or below a mean content of copolymerized $C_3$ to $C_{40}$ alpha-olefins across the MWD of the polymer product.

Embodiment 18

The polymer product of embodiment 17, further exhibiting a melt index ratio (MIR) from 40 to 150.

Embodiment 19

A polymer product, obtainable by the process of any one of embodiments 11 to 16.

Embodiment 20

The polymer product of embodiment 19, further exhibiting an MIR from 40 to 150.

The present disclosure can be further illustrated by the following non-limiting examples.

EXAMPLES

All manipulations were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyllithium (2.5M solution in hexane), methyl(vinyl)dichlorosilane, indene, methyllithium (1.6M solution in diethyl ether), trimethylsilylchloride (TMS-Cl), and Tetrakis(dimethylamido)zirconium $(Zr(NMe_2)_4) \geq 99.99\%$, were purchased from Sigma-Aldrich. Diisobutylaluminum hydride (DIBALH) was procured from Akzo Nobel Polymer Chemicals LLC, and used as received. The following reagents were synthesized according to previously reported procedures: lithium-indenide (Amsharov, K.; Abdurakhmanova, N.; Stepanow, S.; Rauschenbach, S.; Jansen, M.; Kern, K. *Angew. Chem. Int. Ed.*, 2010, 49, 9392-9396), methyl(vinyl)silyl-bis(indene) (Christopher, J. N., Diamond, G. M., Jordan, R. F., and Petersen, J. L., *Organometallics*, 1996, 15, 4038-4044; Holtcamp, M. W., and Lue, C.-T., PCT Application No. WO 2001/034664; Holtcamp, M. W., PCT Application Nos. WO 2000/037513 and WO 99/64476; Tian, J., Soo-Ko, Y., Metcalfe, R., Feng, Y., and Collins, S., *Macromolecules*, 2001, 34, 3120-3122), rac-methyl(vinyl)silyl-bis(indenyl)zirconium bis(dimethylamide) (Christopher, J. N., Diamond, G. M., Jordan, R. F., and Petersen, J. L., *Organometallics*, 1996, 15, 4038-4044; Holtcamp, M. W., and Lue, C.-T., PCT Application No. WO 2001/034664; Holtcamp, M. W., PCT Application Nos. WO 2000/037513 and WO 99/64476; Tian, J., Soo-Ko, Y., Metcalfe, R., Feng, Y., and Collins, S., *Macromolecules*, 2001, 34, 3120-3122), rac-methyl(vinyl)silyl-bis(indenyl)zirconium dichloride (Holtcamp, M. W., and Lue, C.-T., PCT Application No. WO 2001/034664; Holtcamp, M. W., PCT Application Nos. WO 2000/037513 and WO 99/64476; Tian, J., Soo-Ko, Y., Metcalfe, R., Feng, Y., and Collins, S., *Macromolecules*, 2001, 34, 3120-3122), and bis-pentafluorophenylborane (Parks, D. J., Spence, R. E. von H., and Piers, W. E., *Angew. Chem. Int. Ed. Engl.*, 1995, 34, 809-811). $^1$H NMR and $^{19}$F NMR measurements were recorded on a ~400 MHz Bruker spectrometer. Hafnium tetrachloride ($HfCl_4$) 99+% and trimethylsilylmethyl trifluoromethanesulfonate were procured from Strem chemicals and TCI America, respectively, and used as received.

ES-70 875C SMAO

Methylalumoxane treated silica was prepared in a manner similar to the following: In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected. ES-70-875 silica is ES70™ silica (PQ Corporation, Conshohocken, Pa.) that has been calcined at approx. 875° C. Specifically, the ES70™ silica is calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

Example 1—Synthesis of Rac-Methyl(vinyl)silyl-bis(indenyl)zirconium dimethyl (Rac-Me(CH$_2$=CH)Si(Ind)$_2$ZrMe$_2$)

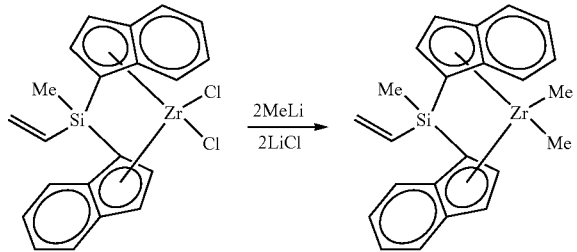

In Example 1, a yellow crystalline solid of Me(CH$_2$=CH)Si(Ind)$_2$ZrCl$_2$ (~4.8 g, ~10.4 mmol) was slurried in toluene (~100 mL) and cooled to about −25° C. To this, a solution of methyllithium (~21.4 mL, ~21.1 mmol; ~1.6 M solution in diethylether) was added drop-wise over a period of ~10-15 minutes. The reaction mixture was gradually warmed to room temperature and then continuously stirred for ~2 hours at room temperature, during which time reaction mixture solution was observed to turn a brownish yellow color. Substantially all volatiles from the reaction mixture were removed in vacuo, and crude materials were triturated with hexane, and then extracted into hexane. Solvent removal under vacuum afforded a substantially colorless crystalline solid of Rac-Me(CH$_2$=CH)Si(Ind)$_2$ZrMe$_2$ (Catalyst A) in ~4.05 g (~92.6%) yield. $^1$H NMR (~400 MHz, in C$_6$D6) showed the following peaks: δ −0.99 (3H, s, Zr—CH$_3$), −0.92 (3H, s, Zr—CH$_3$), 0.61 (3H, s, Si—CH$_3$), 5.71 (1H, d, Ind-CH), 5.81 (1H, d, Ind-CH), 6.10-6.15 (2H, m, Ind-CH), 6.45-6.53 (1H, m, Ind-CH), 6.63-6.71 (2H, m, Ind-CH), 6.78-6.88 (2H, m, Ind-CH), 7.13-7.15 (2H, m, Ind-CH), 7.21-7.23 (1H, m, Ind-CH), and 7.38-7.48 (3H, m, Ind-CH) ppm.

Example 2—Synthesis of Rac-Methyl(vinyl)silyl-bis(indenyl)zirconium bis(pentafluoro-phenoxide) (Rac-Me(CH$_2$=CH)Si(Ind)$_2$Zr(OC$_6$F$_5$)$_2$)

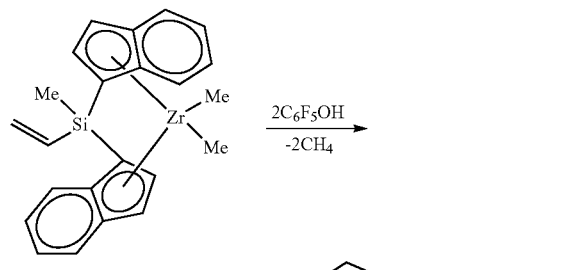

In Example 2, a substantially colorless crystalline solid of rac-Me(vinyl)Si(Ind)$_2$ZrMe$_2$ (~1.9 g, ~4.5 mmol) from Example 1 was dissolved in toluene (~50 mL) and cooled to about −25° C. To this, a solution of C$_6$F$_5$OH (~1.683 g, ~9.1 mmol) in cold toluene was added drop-wise. The resulting mixture was gradually warmed to room temperature and then stirred for about an hour at room temperature, after which substantially all volatiles from were removed in vacuo. The resulting materials were washed with cold pentane to obtain substantially pure rac-Me(vinyl)Si(Ind)$_2$Zr(OC$_6$F$_5$)$_2$ (Catalyst B) in ~3.1 g (~90.6%) yield. $^1$H NMR (~400 MHz, in C$_6$D6) showed the following peaks: δ 0.78 (3H, s, Si—CH$_3$), 6.12-6.24 (2H, m, Ind-CH), 6.30-6.36 (2H, m, Ind-CH), 6.40-6.44 (3H, m, Ind-CH), 6.54-6.66 (3H, m, Ind-CH), 7.01-7.13 (3H, m, Ind-CH), 7.34-7.37 (1H, dd, Ind-CH), and 7.59-7.62 (1H, m, Ind-CH) ppm. $^{19}$F NMR (~400 MHz, in C$_6$D6) showed the following peaks: δ-172.6 to ~172.4 (m), ~166.6 to ~166.4 (m), and ~163.2 to ~163.0 (m) ppm.

Example 3—Synthesis of Rac-Methyl(bis-isobutyl-aluminum-ethyl)silyl-bis(Indenyl)-zirconium bis(pentafluorophenoxide) (Rac-Me(iBu$_2$AlEt)Si(Ind)$_2$Zr(OC$_6$F$_5$)$_2$)

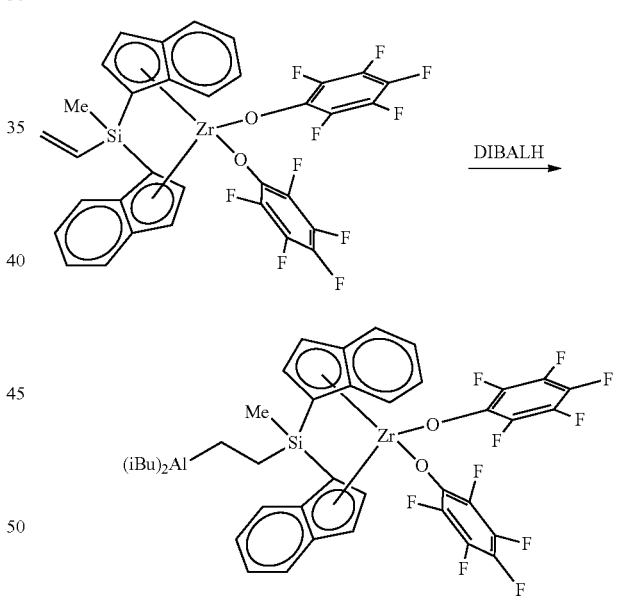

In Example 3, a substantially colorless crystalline solid of rac-Me(vinyl)Si(Ind)$_2$Zr(OC$_6$F$_5$)$_2$ (~1.49 g, ~2.0 mmol) from Example 2 was dissolved in toluene (~40 mL) and chilled to about −25° C. To this, a solution of DIBAL-H (~0.28 g, ~2.0 mmol) in toluene (~10 mL) was added. The resulting mixture was first warmed to room temperature and then stirred about 30 minutes at room temperature. Substantially all volatiles were removed, and then crude materials were washed with cold hexane to afford a substantially colorless solid of Rac-Me(iBu$_2$AlCH$_2$CH$_2$)Si(Ind)$_2$Zr(OC$_6$F$_5$)$_2$ (Catalyst D) in ~1.4 g (~79.1%) yield. $^1$H NMR (~400 MHz, in $C_6D_6$) showed the following peaks: δ 1.30-0.48 (23H, m, Al-alkyls and aliphatic protons), 2.02-2.12 (2H, m, $CH_2$), 6.12-6.24 (2H, m, Ind-CH), 6.30-6.44 (4H, m, Ind-CH), 6.55-6.66 (3H, m, Ind-CH), 7.09 (1H, d, Ind-CH), 7.36 (1H, d, Ind-CH), and 7.61 (1H, d, Ind-CH) ppm. $^{19}F$ NMR (~400 MHz, in $C_6D_6$) showed the following peaks: δ −172.5 to −172.6 (m), −166.5 to −166.6 (m), −163.1 to −163.2 (m), −160.8 to −161.0 (m), −160.5 to −160.6 (m), and −153.7 to −153.7 (m) ppm.

Without meaning to be bound by theory, it is believed that one or more of the moieties attached to the transition metal and/or to the group 13 metal of the metallocene compounds according to the invention can reversibly react and/or be exchanged with one or more corresponding moieties attached to an activator metal. In some embodiments, the interactions of these moieties with the metallocene cation can affect certain characteristics of the cation-anion pair and thus may play a role in altering or tailoring catalyst system activity, incorporating ability of comonomer(s) relative to monomer, molecular capability, polymerization rate, and/or other polymerization characteristics that depend on the kinetics of the catalyst system. For instance, the scheme below shows the metallocene compound (Catalyst D) obtained from Example 3 in various states of exchange with a supported activator of the methylalumoxane (MAO) type, indicating a plethora of different possible coordination mechanisms.

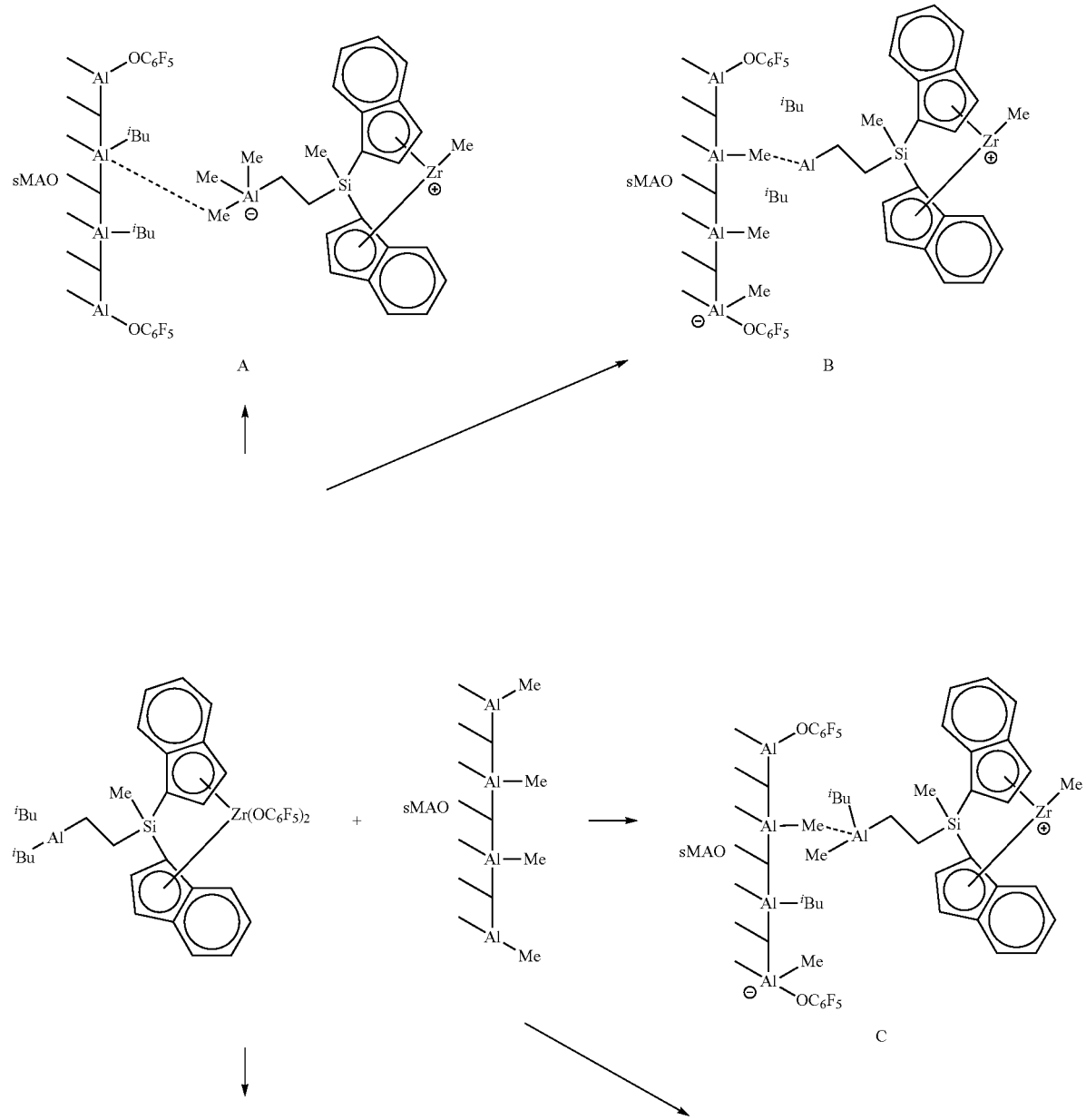

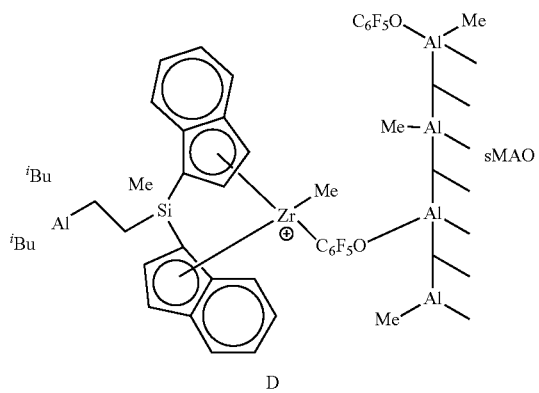

D

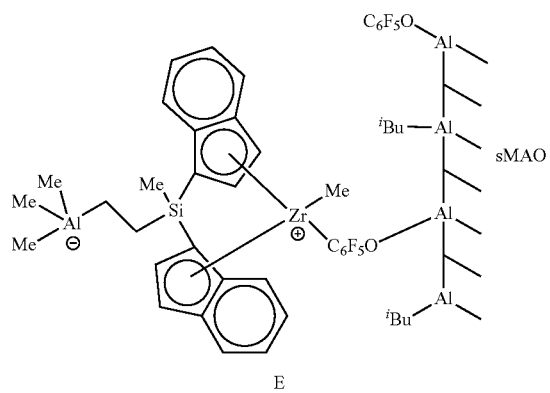

E

Example 4—Synthesis of Rac-Methyl(bis-pentafluorophenylborane-ethyl)silyl-bis(Indenyl)-zirconium bis(pentafluorophenoxide) (Rac-Me((C$_6$F$_5$)$_2$BEt)Si(Ind)$_2$Zr(OC$_6$F$_5$)$_2$ and also confirmed disappearance of the vinyl group and appearance of ethyl group, presumably via B—H vinyl group insertion. Substantially all volatiles were removed in vacuo, and crude materials were washed with cold pentane

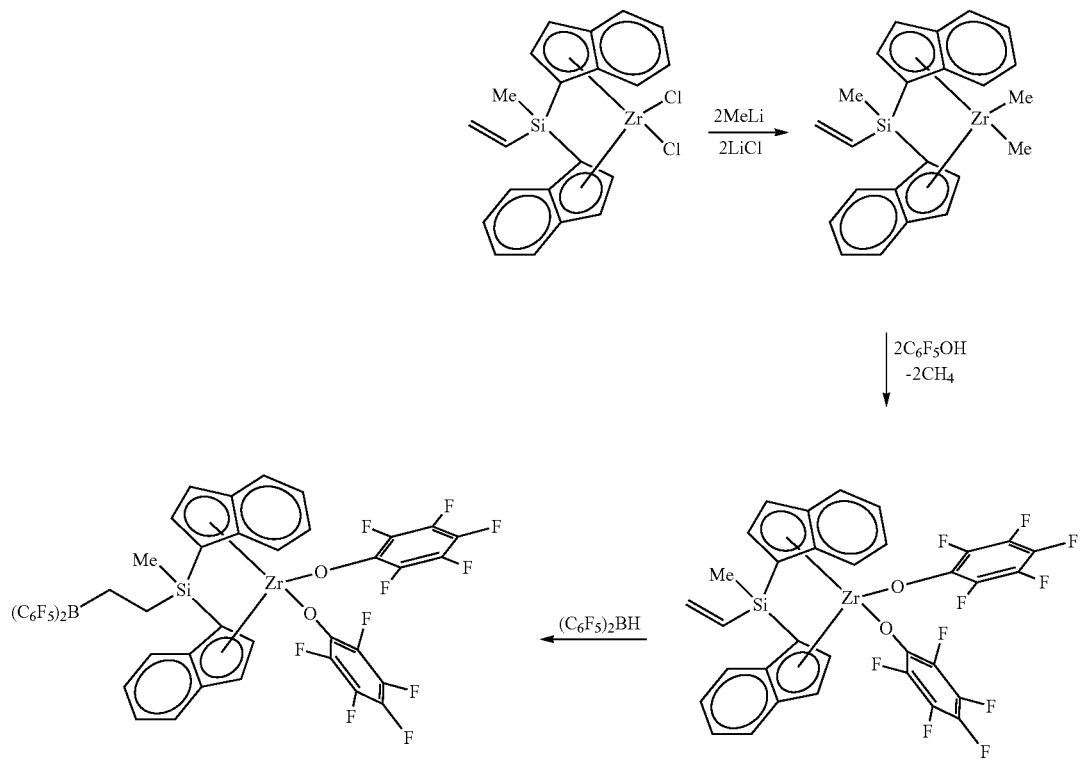

In Example 4, the procedures of Examples 1 and 2 were utilized to obtain substantially pure rac-Me(vinyl)Si(Ind)$_2$Zr (OC$_6$F$_5$)$_2$. As a substantially colorless crystalline solid, rac-Me(vinyl)Si(Ind)$_2$Zr(OC$_6$F$_5$)$_2$ (~1.51 g, ~2.0 mmol) was dissolved in toluene (~25 mL) and chilled to about −25° C. To this, a colorless solid of bis(pentafluorophenyl)borane (~0.69 g, ~2.0 mmol) was added. The resulting mixture was first warmed to room temperature and then heated to about 70° C. for about 15 minutes, at which point the mixture/ solution had completely turned a clear pale yellow color. $^1$H NMR and $^{19}$F NMR supported single compound formation or hexane to obtain a pale yellow crystalline solid of Rac-Me((C$_6$F$_5$)$_2$BCH$_2$CH$_2$)Si(Ind)$_2$Zr(OC$_6$F)$_2$ (Catalyst C) in ~1.6 g (~72.7%) yield. $^1$H NMR (~400 MHz, in C$_6$D$_6$) showed the following peaks: δ 0.91 (3H, s, Si—CH$_3$), 1.50-1.66 (2H, m, CH$_2$), 2.20 (2H, t, CH$_2$), 6.30 (2H, t, Ind-CH), 6.35-6.45 (4H, m, Ind-CH), 6.62-6.68 (2H, m, Ind-CH), 7.1 (2H, m, Ind-CH), and 7.41-7.46 (2H, m, Ind-CH) ppm. $^{19}$F NMR (~400 MHz, in C$_6$D$_6$) showed the following peaks: δ −172.1 to −172.3 (m), −166.2 to −166.5 (m), −163.4 to −163.5 (m), −163.0 to −163.3 (m), −160.1 to −160.2 (m), −159.8 to −159.9 (m), −144.6 to −145.6 (m), −141.41 to −141.6 (m), −129.7 to −129.8 (m), and −128.6 to −128.7 (m) ppm.

Example 5—Synthesis of Trimethylsilylmethylcyclopentadiene (Me$_3$SiCH$_2$CpH)

In Example 5, a neat trimethylsilylmethyl trifluoromethanesulfonate (~25.0 g, ~105.8 mmol) was dissolved in ~300 mL of diethyl ether and cooled to about −25° C. To this, a solid potassium cyclopentadienide (~11.14 g, ~106.9 mmol) was slowly added over a period of about 10-15 minutes. The resulting mixture was stirred overnight at room temperature, after which insoluble materials were filtered out. Substantially all volatiles from the reaction mixture were carefully removed under dynamic vacuum, to avoid evaporating the semi-volatile trimethylsilylmethylcyclopentadiene, (Me$_3$Si)CH$_2$CpH. The reaction flask (~250 mL round bottom flask) and frit with celite were weighted to calculate yield of the product after extraction. The crude materials were then extracted into pentane (3×~50 mL) and used without any further purification. Based on above mathematical method, the yield was calculated as ~15.47 g (~95.2%). The $^1$H NMR spectrum (~400 MHz, in C$_6$D$_6$) was recorded for the crude material to ensure the product formation and showed the following peaks: δ −0.05 (9H, s, Si—CH$_3$), 1.77 (2H, d, J$_{HH}$=1.2 Hz, Me$_3$Si—CH$_2$), 2.83 (1H, sex, J$_{HH}$=1.5 Hz, Cp-CH), and 5.80-6.49 (4H, m, Cp-CH) ppm.

Example 6—Synthesis of Lithium Trimethylsilylmethylcyclopentadienyl (Me$_3$SiCH$_2$CpLi)

In Example 6, a hexane solution of n-butyl lithium (~41.5 mL, ~103.8 mmol, ~2.5M solution) was added drop wise to a precooled solution (1:1 mixture of pentane and diethyl ether, ~200 mL) of Me$_3$SiCH$_2$CpH (~15.47 g, ~101.7 mmol, from Example 5) over a period of about 40-50 minutes at about −25° C. The resulting mixture was gradually brought to room temperature and then continuously stirred overnight. Substantially all volatiles were removed in vacuo, and remaining crude materials were thoroughly washed with pentane. The remaining materials were dried under vacuum to obtain a substantially colorless crystalline solid of Me$_3$SiCH$_2$CpLi in ~13.6 g (~84.6%) yield. $^1$H NMR (~400 MHz, in THF-d$_8$) showed the following peaks: δ −0.09 (9H, s, Si—CH$_3$), 1.84 (2H, s, Me$_3$Si—CH$_2$), 5.36 (2H, t, J$_{HH}$=2.6 Hz, Cp-CH), and 5.47 (2H, t, J$_{HH}$=2.6 Hz, Cp-CH) ppm.

Example 7—Synthesis of Methyl(vinyl)silyl-bis(trimethylsilylmethylcyclopentadiene) (Me(vinyl)Si(Me$_3$SiCH$_2$CpH)$_2$)

In Example 7, a neat Me(vinyl)SiCl$_2$ (~1.98 g, ~14.0 mmol) was dissolved in ~70 mL of THF and cooled to about −25° C. To this, a solid Me$_3$SiCH$_2$CpLi (~4.43 g, ~28.0 mmol) from Example 6 was added, and the resulting mixture was stirred overnight at room temperature to ensure completion of the reaction. Substantially all volatiles from the reaction mixture were removed in vacuo, and the crude materials were subsequently triturated with pentane and extracted into pentane. Subsequent solvent removal under vacuum afforded a thick yellow viscous oil of Me(vinyl)Si(Me$_3$SiCH$_2$CpH)$_2$ in ~5.12 g (~98.1%) yield. $^1$H NMR (~400 MHz, in C$_6$D$_6$) showed the following peaks: δ 0.04-(−) 0.14 (21H, m, SiMe$_3$ and SiMe-CH$_3$), 1.85 (4H, bm, Me$_3$Si—CH$_2$), 2.95 (1H, s, Cp-CH), 3.49 (1H, s, Cp-CH), and 6.77-5.65 (9H, m, Cp-CH and vinyl-CH and —CH$_2$) ppm.

Example 8—Synthesis of Lithium methyl(vinyl)silyl-bis(trimethylsilylmethyl-cyclopentadienyl) (Me(vinyl)Si(Me$_3$SiCH$_2$Cp)$_2$Li$_2$)

In Example 8, a hexane solution of n-butyl lithium (~11.3 mL, ~28.1 mmol, ~2.5M solution) was added drop wise to a precooled solution of Me(vinyl)Si(Me$_3$SiCH$_2$CpH)$_2$ (~5.12 g, ~13.7 mmol, from Example 7) in ~80 mL of THF over a period of about 10-15 minutes at about −25° C. The resulting mixture was gradually warmed to room temperature and then continuously stirred overnight. Substantially all volatiles from the reaction mixture were removed in vacuo, and the crude materials were triturated with pentane, followed by a thorough washing with pentane to remove any soluble impurities. The resulting mixture was dried under vacuum to obtain the substantially colorless crystalline solid of Me(vinyl)Si(Me$_3$SiCH$_2$Cp)$_2$Li$_2$ in ~5.12 g (~96.9%) yield. $^1$H NMR (~400 MHz, in THF-d$_8$) showed the following peaks: δ 0.39-(−)0.08 (24H, m, SiMe$_3$-CH$_3$, SiMe-CH$_3$ and vinyl-CH and —CH$_2$), 1.88 (4H, bm, Me$_3$Si—CH$_2$), and 5.81-5.39 (6H, m, Cp-CH) ppm.

Example 9—Synthesis of Rac-meso-methyl(vinyl)silyl-bis(trimethylsilylmethyl-cyclopentadienide) hafnium dichloride (Rac-meso-Me(vinyl)Si(Me$_3$SiCH$_2$Cp)$_2$HfCl$_2$))

In Example 9, a solid HfCl$_4$ (~4.93 g, ~15.4 mmol) was added to a precooled diethyl ether (~100 mL) solution of Me(vinyl)Si(Me$_3$SiCH$_2$Cp)$_2$Li$_2$ (~5.92 g, ~15.4 mmol, from Example 8) at about −25° C. The resulting mixture was stirred overnight at room temperature, after which insoluble materials were filtered out. Substantially all volatiles from the reaction mixture were removed in vacuo, and the crude materials were washed with cold pentane to remove any soluble impurities. The resulting mixture was dried under vacuum to obtain the substantially brownish semi-crystalline solid of Me(vinyl)Si(Me$_3$SiCH$_2$Cp)$_2$HfCl$_2$ in ~9.4 g (~98.6%) yield. $^1$H NMR (~400 MHz, in CD$_2$Cl$_2$) showed the following peaks: δ −0.03-(−)0.04 (24H, m, SiMe$_3$-CH$_3$ and SiMe-CH$_3$), 1.20 (3H, m, vinyl-CH and —CH$_2$), 2.13 (4H, bm, Me$_3$Si—CH$_2$), 5.29-5.15 (2H, m, Cp-CH), 5.79-5.64 (2H, m, Cp-CH), and 6.36-6.17 (2H, m, Cp-CH) ppm.

Example 10—Synthesis of Rac/meso-methyl(vinyl)silyl-bis(trimethylsilylmethyl-cyclopentadienide) hafnium dimethyl (Rac/meso-Me(vinyl)Si(Me$_3$SiCH$_2$Cp)$_2$HfMe$_2$))

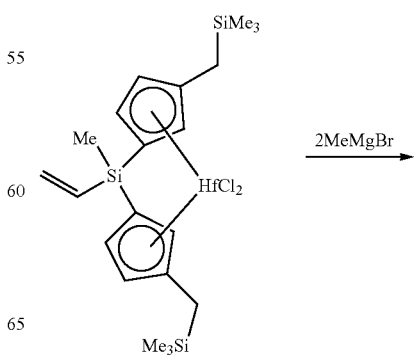

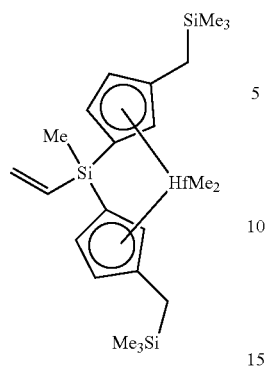

In Example 10, the procedures of Examples 5-9 were utilized to obtain rac/meso-Me(vinyl)Si(Me₃SiCH₂Cp)₂HfCl₂, which was then dissolved in diethyl ether and cooled. An ethereal solution of MeMgBr (~10.2 mL, ~30.6 mmol) was added drop wise to the precooled diethyl ether solution of rac/meso-Me(vinyl)Si(Me₃SiCH₂Cp)₂HfCl₂ (~9.4 g, ~15.2 mmol) over a period of about 10-15 minutes at about −25° C. The resulting mixture was stirred for about 2 hours at room temperature, and an aliquot was tested to ensure completion of reaction, after which insoluble materials were filtered through a pad of celite. Substantially all volatiles from the filtrate were removed under vacuum, and then the crude materials were extracted into pentane. Solvent removal in vacuo afforded a sticky brownish-yellow material of rac/meso-Me(vinyl)Si(Me₃SiCH₂—Cp)₂HfMe₂ (Catalyst E) in ~7.89 g (~89.9%) yield. ¹H NMR (~400 MHz, in C₆D₆) showed the following peaks: δ 0.3-(−)0.23 (27H, bm, SiMe₃-CH₃, SiMe-CH₃ and Hf—CH₃), 1.35 (3H, bs, vinyl-CH and —CH₂), 2.11 (4H, bm, Me₃Si—CH₂), 5.74-5.04 (3H, m, Cp-CH), and 6.65-6.20 (3H, m, Cp-CH) ppm.

Example 11—Synthesis of Rac/meso-methyl(vinyl) silyl-bis(trimethylsilylmethyl-cyclopentadienide) hafnium bis(pentafluorophenoxide) (Rac/meso-Me(vinyl)Si(Me₃SiCH₂Cp)₂Hf(OC₆F₅)₂)

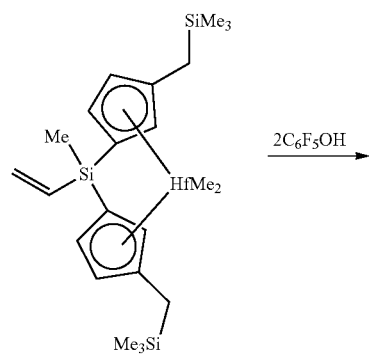

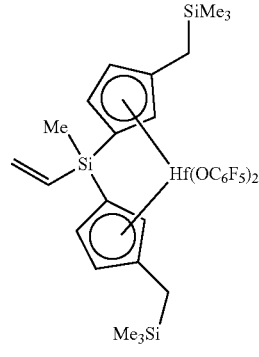

In Example 11, a pale yellow rac/meso-Me(vinyl)Si(Me₃SiCH₂Cp)₂HfMe₂ (~2.1 g, ~3.6 mmol, from Example 10) was dissolved in toluene (~50 mL) and cooled to about −25° C. To this, a solution of C₆F₅OH (~1.34 g, ~7.3 mmol) in cold toluene was added drop-wise. The resulting mixture was gradually warmed to room temperature and then stirred for ~2 hours at room temperature. Substantially all volatiles from the reaction mixture were removed in vacuo, and the resulting materials were washed with cold pentane to obtain rac/meso-Me(vinyl)Si(Me₃SiCH₂—Cp)₂Hf(OC₆F₅)₂ in ~2.7 g (~81.4%) yield. ¹H NMR (~400 MHz, in C₆D₆) showed the following peaks: δ −0.18-0.07 (21H, m, SiMe and SiMe₃), 1.36 (3H, m, vinyl C—H), 1.79-2.05 (4H, m, —CH₂—SiMe₃), and 5.65-6.08 (6H, m, Cp-CH). ¹⁹F NMR (~400 MHz, in C₆D₆) showed the following peaks: δ −171.4 (m), −166.6 (m), −165.4 (m), −164.3 (m), −163.4 (m), −162.6 (m), −161.6 (m), and −158.9 (m) ppm.

Example 12—Synthesis of Rac/meso-methyl(diisobutylaluminum-ethyl)silyl-bis(trimethylsilylmethylcyclopentadienide)hafnium bis(pentafluorophenoxide) (Rac/meso-Me(iBu₂AlEt)Si(Me₃SiCH₂Cp)₂Hf(OC₆F₅)₂)

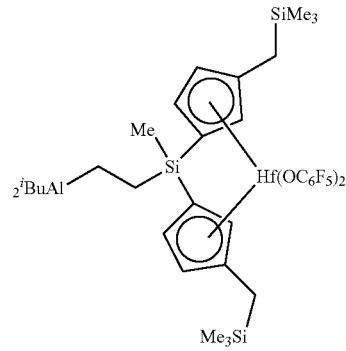

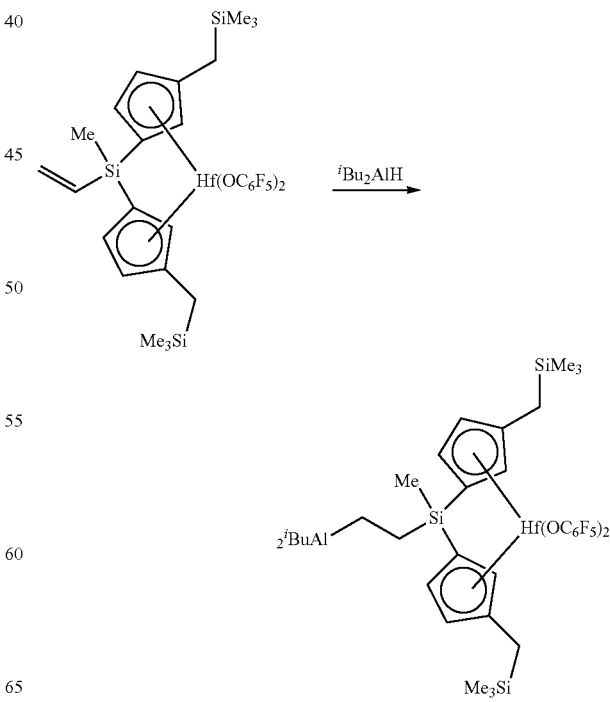

In Example 12, a colorless crystalline solid of rac/meso-Me(vinyl)Si(Me$_3$SiCH$_2$Cp)$_2$Hf(OC$_6$F$_5$)$_2$ (~1.02 g, ~1.1 mmol, from Example 11) was dissolved in toluene (~15 mL) and chilled to about −25° C. To this, a neat DIBAL-H (~0.15 g, ~1.1 mmol) in toluene was added drop-wise. The resulting mixture was stirred overnight at room temperature. $^1$H NMR and $^{19}$F NMR supported substantially complete conversion/formation of product by confirming disappearance of the vinyl group and appearance of ethyl group, presumably via B—H vinyl group insertion. Substantially all volatiles were removed in vacuo, and crude materials were washed with cold pentane to obtain a substantially colorless solid of rac/meso-Me(iBu$_2$AlCH$_2$CH$_2$)Si(Me$_3$SiCH$_2$Cp)$_2$Hf(OC$_6$F$_5$)$_2$ (Catalyst F) in ~0.97 g (~82.3%) yield. $^1$H NMR (~400 MHz, in C$_6$D$_6$) showed the following peaks: δ −0.05 (18H, m, SiMe$_3$), 0.48 (4H, m, $^t$Bu-CH$_2$), 1.06 (12H, d, $^t$Bu-CH$_3$), 1.36 (6H, m, Si—CH$_3$ and vinyl CH), 2.13 (6H, m, —CH$_2$SiMe$_3$ and iBu-CH), and 5.84 (6H, m, Cp-CH) ppm. $^{19}$F NMR (~400 MHz, in C$_6$D$_6$) showed the following peaks: δ −160.9 (m), −160.5 (m), and −153.9 (d) ppm.

Example 13—Synthesis of Rac/meso-methyl(bis-pentafluorophenylboro-ethyl)silyl-bis(trimethylsilyl-methylcyclopentadienide)hafnium bis(pentafluoro-phenoxide) (Rac/meso-Me((C$_6$F$_5$)$_2$BEt)Si(Me$_3$SiCH$_2$Cp)$_2$Hf(OC$_6$F$_5$)$_2$)

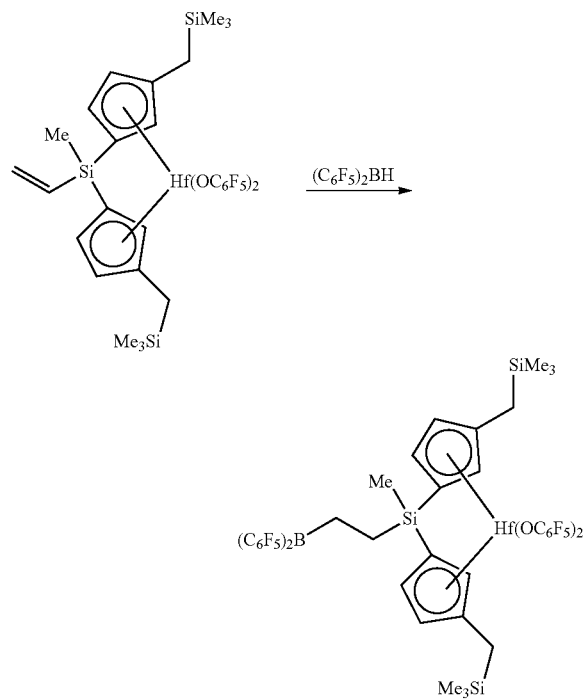

In Example 13, the procedure of Example 11 was utilized to obtain rac/meso-Me(vinyl)Si(Me$_3$SiCH$_2$Cp)$_2$Hf(OC$_6$F$_5$)$_2$. As a substantially colorless crystalline solid, rac/meso-Me(vinyl)Si(Me$_3$SiCH$_2$Cp)$_2$Hf(OC$_6$F$_5$)$_2$ (~0.97 g, ~1.0 mmol) was dissolved in toluene (~15 mL) and chilled to about −25° C. To this, a colorless solid of bis(pentafluoro-phenyl)borane (~0.86 g, ~1.0 mmol) was added. The resulting mixture was first warmed to room temperature and then heated to about 70° C. for about 30 minutes, at which point the mixture/solution had completely turned a clear pale yellow color. $^1$H NMR and $^{19}$F NMR supported substantially complete conversion/formation of product by confirming disappearance of the vinyl group and appearance of ethyl group, presumably via B—H vinyl group insertion. Substantially all volatiles were removed in vacuo, and crude materials were washed with cold pentane to obtain a colorless solid of rac/meso-Me((C$_6$F$_5$)$_2$BCH$_2$CH$_2$)Si(Me$_3$SiCH$_2$Cp)$_2$Hf(OC$_6$F$_5$)$_2$ (Catalyst G) in ~0.94 g (~70.3%) yield. $^1$H NMR (~400 MHz, in C$_6$D$_6$) showed the following peaks: δ −0.12 (21H, m, Si—CH$_3$ and SiMe$_3$), 1.36 (4H, m, B—CH$_2$), 1.96 (4H, m, —CH$_2$—SiMe$_3$), and 5.94 (6H, m, Cp-CH) ppm. $^{19}$F NMR (~400 MHz, in C$_6$D$_6$) showed the following peaks: δ −165.5 (m), −163.8 (m), −161.2 (m), −159.8 (m), −157.6 (m), −146.0 (m), 143.9 (m), 141.3 (m), 132.9 (m), 130.9 (m), and 128.6 (m) ppm.

Examples 14-20—Copolymerizations of Ethylene and Hexene with Various Metallocene Catalyst Systems Examples 14-20 involve polymerizations of a combination of ethylene monomer and hexene comonomer using metallocene compounds A-G (the products from Examples 1, 2, 4, 3, 10, 12, and 13), respectively, each in combination with a supported MAO activator, ES-70 875C SMAO (prepared as described above). The catalysts were supported using a procedure similar to the following: About 60.0 g of ES-70 875C SMAO is added to a Celestir™ vessel along with about 150 mL toluene. To that mixture, 11 to 14 mg of catalyst compound (see Table 1), first dissolved in about 20 mL toluene, is then added. After stirring for about 3 hours, the slurry is then filtered, washed with about 20 mL toluene, and then washed with several about 30 mL portions of hexane. The product is then dried under vacuum to obtain supported mixed catalyst.

Table 1 below shows various characteristics of the polymerizations and of the polymer products resulting therefrom, with the wt % C$_6$ comonomer representing an average (mean) incorporation level in the copolymer product.

The polymerization procedure was as follows: a ~2 L autoclave was heated to about 110° C. and purged with N$_2$ for at least 30 minutes. It was charged with dry NaCl (~350 g; Fisher, S271-10 dehydrated at ~180° C. and subjected to several pump/purge cycles and finally passed through a ~16-mesh screen prior to use) and ES-70 875C SMAO (~5 g) at about 105° C. and stirred for ~30 minutes. The temperature was adjusted to ~85° C. At a pressure of ~2 psig N$_2$, dry, degassed 1-hexene (~2.0 mL) was added to the reactor with a syringe then the reactor was charged with N$_2$ to a pressure of 20 psig. A mixture of H$_2$ and N$_2$ was flowed into reactor (~120 SCCM; ~10% H$_2$ in N$_2$) while stirring the bed. Each of the supported metallocene compounds A-G was individually injected into the reactor with ethylene at a pressure of ~220 psig. Ethylene flow was allowed over the course of the run to maintain approximately constant pressure in the reactor. 1-Hexene was fed into the reactor as a ratio to ethylene flow (~0.1 g/g). Hydrogen was fed to the reactor as a ratio to ethylene flow (~0.5 mg/g). The hydrogen and ethylene ratios were measured by on-line GC analysis. Polymerizations were halted after ~1 hour by venting the reactor, cooling to room temperature then exposing to air. The salt was removed by washing with water two times, and the polymer product was isolated by filtration, briefly washed with acetone, and dried in air for at least two days.

TABLE I

| Example/ Catalyst | Yield (g) | Catalyst (mg) | Activity (g P/g cat) | Mw*; Mn* [PDI] | Mz*; g' vis | Wt % C6 comonomer | MIR |
|---|---|---|---|---|---|---|---|
| 14/A | 44.9 | 11.1 | 4050 | 75600; 19300 [3.91] | 775800; 0.93 | 12.9 | 108 |
| 15/B | 63.5 | 14.1 | 4500 | 87400; 16700 [5.25] | 695900; 0.87 | 10.9 | 90.9 |
| 16/C | 35.9 | 12.1 | 2970 | 105000; 13900 [7.54] | 1444000; 0.89 | 10.4 | 63.5 |
| 17/D | 59.8 | 13.7 | 4370 | — | — | 10.7 | 81.8 |
| 18/E | 57.5 | 12.3 | 4680 | 98800; 24900 [3.97] | 336700; 0.99 | 12.5 | — |
| 19/F | 64.7 | 12.0 | 5390 | 99600; 23700 [4.21] | 619300; 0.96 | 12.8 | — |
| 20/G | 79.7 | 12.7 | 6280 | 104600; 19900 [5.25] | 993100; 0.97 | 15.5 | — |

*g/mol

The FIGURE shows a GPC trace for LLDPE from the catalyst system including metallocene compound F indicates a relatively broad orthogonal comonomer distribution, in which the low molecular weight end of the distribution contains about 8 wt % incorporated hexene and the high molecular weight end of the distribution contains about 15 wt % incorporated hexene. The relative breadth is shown by the PDI of at least 4 (or at least 4.1), and the orthogonality of the comonomer (hexene) distribution can be seen by the correspondence of lower comonomer incorporation levels with the lower molecular weight end of the distribution and of higher comonomer incorporation levels with the higher molecular weight end of the distribution, as well as the generally increasing trend in comonomer incorporation level between the lower and higher portions of the molecular weight distribution. It is believed that an orthogonal comonomer distribution is a relatively rare phenomenon, even rarer when a single catalyst system is used to make a single-reaction (even if multiple-reaction-zone) product instead of by blending products of two or more discrete reaction systems and/or from two or more catalyst systems (whether as a single mixed catalyst system or via multiple single catalyst systems). Based on the data in Table 1, for example, it is proposed that the inclusion of the group 13 element not only increases breadth of distribution (PDI) but also increases (or creates) orthogonality of distribution.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As should be apparent from the foregoing general description and the specific embodiments, while forms of the invention have been illustrated and described, various modifications can be made without departing from the spirit and scope of the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Accordingly, it is not intended that the invention be limited thereby. Likewise, the term "comprising" is considered synonymous with the term "including." Also, whenever a composition, an element, or a group of elements is preceded with the transitional phrase "comprising," it should be understood that the same composition or group of elements is contemplated with transitional phrases "consisting essentially of," "consisting of," "selected from the group of consisting of," or "is" preceding the recitation of the composition, element, or elements, and vice versa.

What is claimed is:
1. A metallocene catalyst compound represented by the formula:

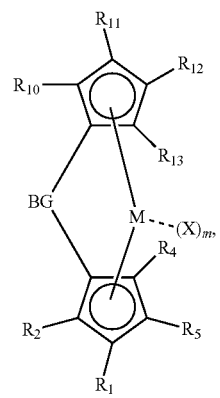

wherein:
each of $R^4$ and $R^5$ is a hydrogen, a substituted or unsubstituted linear, branched linear, or cyclic $C_1$-$C_{30}$ hydrocarbyl group, or a substituted or unsubstituted linear, branched linear, or cyclic $C_1$-$C_{30}$ hydrosilylcarbyl group;
$R^1$ and $R^2$ are each independently a hydrogen or a substituted or unsubstituted linear, branched linear, or cyclic $C_1$-$C_{30}$ hydrocarbyl group, or $R^1$ and $R^2$, taken together with the carbon atoms in the first cyclopentadienyl ring to which they are directly connected, collectively form one or more substituted or unsubstituted rings annelated to the first cyclopentadienyl ring;
each of $R^{10}$ and $R^{11}$ is a hydrogen or a substituted or unsubstituted linear, branched linear, or cyclic $C_1$-$C_{30}$ hydrocarbyl group;
$R^{12}$ and $R^{13}$ are each independently a hydrogen or a substituted or unsubstituted linear, branched linear, or cyclic $C_1$-$C_{30}$ hydrocarbyl group, or $R^{12}$ and $R^{13}$, taken together with the carbon atoms in the second cyclopentadienyl ring to which they are directly connected, collectively form one or more substituted or unsubstituted rings annelated to the second cyclopentadienyl ring;

M is a transition metal having an integer valency of v;

each X is independently a halogen, a hydride, an amide, an alkoxide, a substituted alkoxide, or a $C_1$-$C_{20}$ substituted or unsubstituted linear, branched, or cyclic hydrocarbyl group, a perfluorinated oxyphenyl, a perfluorinated oxynaphthyl, or optionally two or more X moieties form a fused ring or ring system;

m is an integer equal to v-2; and the bridging group (BG) comprises —[BA($R^{20}$)$_2$]$_n$—, wherein: n is an integer from 1 to 3; each BA, the same or different at each occurrence, is independently carbon, silicon, or germanium; and each $R^{20}$, the same or different at each occurrence, is each independently a $C_1$-$C_8$ substituted or unsubstituted linear, branched, or cyclic hydrocarbyl group or a pendant group having a formula —$R^{21}$-G13($X^*$)$_2$, where each G13 is a group 13 element, each $R^{21}$ is independently a $C_1$-$C_8$ substituted or unsubstituted linear, branched, or cyclic hydrocarbyl group; and each $X^*$ is independently a halogen, a hydride, an amide, an alkoxide, a substituted alkoxide, a perfluorinated oxyphenyl, a perfluorinated oxynaphthyl, a $C_1$-$C_{20}$ unsubstituted linear, branched, or cyclic hydrocarbyl group, a $C_1$-$C_{20}$ substituted linear, branched or non-aromatic cyclic hydrocarbyl group, or a $C_1$-$C_{20}$ substituted aromatic cyclic hydrocarbyl group, where the substitution on the substituted aromatic cyclic hydrocarbyl is selected from $NR^*_2$, $OR^*$, where $R^*$ is, independently, hydrogen or a hydrocarbyl, or where at least one heteroatom has been inserted within the aromatic hydrocarbyl ring, provided that at least one $R^{20}$ is a pendant group of the formula —$R_{21}$-$G_{13}$($X^*$)$_2$.

2. The metallocene compound of claim 1, wherein M comprises Zr or Hf, v is 4, and m is 2.

3. The metallocene compound of claim 1, wherein each $X^*$ is independently a methyl, an ethyl, an n-propyl, an isopropyl, an n-butyl, a sec-butyl, an isobutyl, a tert-butyl, a phenyl, a benzyl, a perfluorinated oxyphenyl, a perfluorinated oxynaphthyl, a chloride, a bromide, or an iodide.

4. The metallocene compound of claim 1, wherein the metallocene compound has a structure represented by formula below:

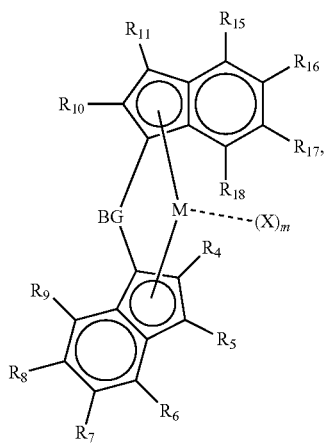

wherein:

each of $R^4$ and $R^5$ is a hydrogen, a substituted or unsubstituted linear, branched linear, or cyclic $C_1$-$C_{30}$ hydrocarbyl group, or a substituted or unsubstituted linear, branched linear, or cyclic $C_1$-$C_{30}$ hydrosilylcarbyl group;

each of $R^{10}$ and $R^{11}$ is a hydrogen or a substituted or unsubstituted linear, branched linear, or cyclic $C_1$-$C_{30}$ hydrocarbyl group;

$R^6$, $R^7$, $R^8$, $R^9$, $R^{15}$, $R^{16}$, $R^{17}$, and $R^{18}$ are each independently a hydrogen or a substituted or unsubstituted linear, branched linear, or cyclic $C_1$-$C_6$ hydrocarbyl group;

M is a transition metal having an integer valency of v;

each X is independently a halogen, a hydride, an amide, an alkoxide, a substituted alkoxide, a perfluorinated oxyphenyl, a perfluorinated oxynaphthyl, or a $C_1$-$C_{20}$ substituted or unsubstituted linear, branched, or cyclic hydrocarbyl group, or optionally two or more X moieties form a fused ring or ring system;

m is an integer equal to v-2; and the bridging group (BG) comprises —[BA($R^{20}$)$_2$]$_n$—, wherein: n is an integer from 1 to 3; each BA, the same or different at each occurrence, is independently carbon, silicon, or germanium; and each $R^{20}$, the same or different at each occurrence, is each independently a $C_1$-$C_8$ substituted or unsubstituted linear, branched, or cyclic hydrocarbyl group or a pendant group having a formula —$R^{21}$-G13($X^*$)$_2$, where each G13 is a group 13 element, each $R^{21}$ is independently a $C_1$-$C_8$ substituted or unsubstituted linear, branched, or cyclic hydrocarbyl group, and each $X^*$ is independently a halogen, a hydride, an amide, an alkoxide, a substituted alkoxide, a $C_1$-$C_{20}$ unsubstituted linear, branched, or cyclic hydrocarbyl group, a $C_1$-$C_{20}$ substituted linear, branched or non-aromatic cyclic hydrocarbyl group, or a $C_1$-$C_{20}$, substituted aromatic cyclic hydrocarbyl group, where the substitution on the aromatic cyclic hydrocarbyl is selected from $NR^*_2$, $OR^*$, where $R^*$ is, independently, hydrogen or a hydrocarbyl, or where at least one heteroatom has been inserted within the aromatic hydrocarbyl ring, provided that at least one $R^{20}$ is a pendant group of the formula —$R^{21}$-G13($X^*$)$_2$.

5. The metallocene compound of claim 4, wherein at least eight of $R^4$, $R^5$, $R^6$, $R^7$, $R^8$, $R^9$, $R^{10}$, $R^{11}$, $R^{15}$, $R^{16}$, $R^{17}$, and $R^{18}$ are a hydrogen.

6. The metallocene compound of claim 5, wherein:

each of $R^4$ and $R^5$ is a hydrogen or a substituted or unsubstituted linear, branched linear, or cyclic $C_1$-$C_8$ hydrocarbyl group;

each of $R^{10}$ and $R^{11}$ is a hydrogen or a substituted or unsubstituted linear, branched linear, or cyclic $C_1$-$C_8$ hydrocarbyl group;

at least ten of $R^4$, $R^5$, $R^6$, $R^7$, $R^8$, $R^9$, $R^{10}$, $R^{11}$, $R^{15}$, $R^{16}$, $R^{17}$, and $R^{18}$ are a hydrogen;

M is Hf or Zr, v is 4 and m is 2;

each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide; and the bridging group (BG) is —[BA($R^{20}$)$_2$]—, wherein: the bridging atom, BA, is carbon or silicon; one $R^{20}$ is a $C_1$-$C_8$ substituted or unsubstituted linear, branched, or cyclic hydrocarbyl group; and the other $R^{20}$ is a pendant group having a formula —$R^{21}$-G13($X^*$)$_2$, where G13 is boron or aluminum, $R^{21}$ is a $C_1$-$C_8$ substituted or unsubstituted linear, branched, or cyclic hydrocarbyl group, and each X* is independently a halogen, a hydride, an amide, an alkoxide, a substituted alkoxide, a $C_1$-$C_{20}$ unsubstituted linear, branched, or cyclic hydrocarbyl group, a $C_1$-$C_{20}$ substituted linear, branched or non-aromatic cyclic hydrocarbyl group, or a $C_1$-$C_{20}$, substituted aromatic cyclic hydrocarbyl group, where the substitution on the aromatic cyclic hydrocarbyl is selected from $NR^*_2$, $OR^*$, where $R^*$ is, independently, hydrogen or a hydrocarbyl, or where at least one heteroatom has been inserted within the aromatic hydrocarbyl ring.

7. The metallocene compound of claim 1, and having the following structure:

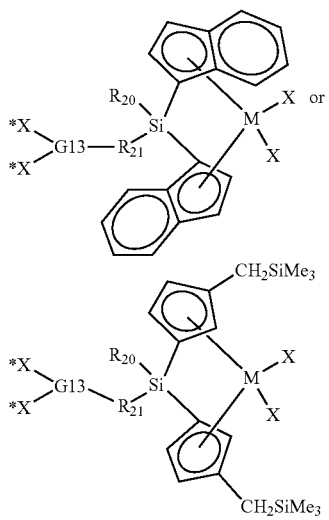

wherein: M is Hf or Zr; v is 2;
each X is independently a methyl, an ethyl, an n-propyl, an isopropyl, an n-butyl, a sec-butyl, an isobutyl, a tert-butyl, a phenyl, a benzyl, a perfluorophenyl, a perfluorobenzyl, a perfluorinated oxyphenyl, a perfluorinated oxynaphthyl, a chloride, a bromide, or an iodide;
each X* is independently a methyl, an ethyl, an n-propyl, an isopropyl, an n-butyl, a sec-butyl, an isobutyl, a tert-butyl, a phenyl, a benzyl, a perfluorinated oxyphenyl, a perfluorinated oxynaphthyl, a chloride, a bromide, or an iodide;
$R^{20}$ and $R^{21}$ are each independently a $C_1$-$C_8$ substituted or unsubstituted linear, branched, or cyclic hydrocarbyl group; and
G13 is boron or aluminum.

8. A catalyst system comprising a metallocene catalyst compound of claim 1, activator, and an optional support.

9. A catalyst system comprising a metallocene catalyst compound of claim 1, activator, and support wherein the activator is alumoxane and the alumoxane is contacted with the support before the catalyst is contacted with the support.

10. The catalyst system of claim 8 wherein the activator is selected from the group consisting of alumoxane,
N,N-dimethylanilinium tetrakis(perfluorophenyl)borane,
N,N-dimethylanilinium tetrakis(perfluoronaphthyl)borane,
N,N-dimethylanilinium tetrakis(perfluorobiphenyl)borane,
N,N-dimethylanilinium tetrakis(3,5-bis(trifluoromethyl) perfluorophenyl)borane,
N,N-dimethylanilinium tetrakis(perfluorophenyl)aluminate,
N,N-dimethylanilinium tetrakis(perfluoronaphthyl)aluminate,
triphenylcarbenium tetrakis(perfluoronaphthyl)borane,
triphenylcarbenium tetrakis(perfluorobiphenyl)borane,
triphenylcarbenium tetrakis(3,5-bis(trifluoromethyl)perfluorophenyl)borane,
triphenylcarbenium tetra(perfluorophenyl)borane,
triphenylcarbenium tetrakis(perfluorophenyl)aluminate,
triphenylcarbenium tetrakis(perfluoronaphthyl)aluminate,
$[Ph_3C^+][B(C_6F_5)_4]$,
$[Me_3NH^+][B(C_6F_5)_4]$,
1-(4-(tris(pentafluorophenyl)borane)-2,3,5,6-tetrafluorophenyl)pyrrolidinium,
4-(tris(pentafluorophenyl)borane)-2,3,5,6-tetrafluoropyridine, and combinations thereof.

11. The metallocene compound of claim 1, wherein each X* is independently a $C_1$-$C_{20}$ unsubstituted linear, branched, or cyclic hydrocarbyl group.

12. The metallocene compound of claim 1, wherein each X* is independently a methyl, an ethyl, an n-propyl, an isopropyl, an n-butyl, a sec-butyl, an isobutyl, a tert-butyl, a chloride, a bromide, or an iodide.

13. The metallocene compound of claim 4, wherein each X* is independently a $C_1$-$C_{20}$ unsubstituted linear, branched, or cyclic hydrocarbyl group.

14. The metallocene compound of claim 4, wherein each X* is independently a methyl, an ethyl, an n-propyl, an isopropyl, an n-butyl, a sec-butyl, an isobutyl, a tert-butyl, a chloride, a bromide, or an iodide.

15. The metallocene compound of claim 7, wherein each X* is independently a $C_1$-$C_{20}$ unsubstituted linear, branched, or cyclic hydrocarbyl group.

16. The metallocene compound of claim 7, wherein each X* is independently a methyl, an ethyl, an n-propyl, an isopropyl, an n-butyl, a sec-butyl, an isobutyl, a tert-butyl, a chloride, a bromide, or an iodide.

* * * * *